US011825325B2

(12) United States Patent
Muruganathan et al.

(10) Patent No.: US 11,825,325 B2
(45) Date of Patent: Nov. 21, 2023

(54) DYNAMIC INDICATION FOR CHANNEL STATE INFORMATION FEEDBACK

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Stephen Grant, Pleasanton, CA (US); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 191 days.

(21) Appl. No.: 16/483,578

(22) PCT Filed: Feb. 6, 2018

(86) PCT No.: PCT/IB2018/050745
§ 371 (c)(1),
(2) Date: Aug. 5, 2019

(87) PCT Pub. No.: WO2018/142380
PCT Pub. Date: Aug. 9, 2018

(65) Prior Publication Data
US 2021/0136610 A1 May 6, 2021

Related U.S. Application Data

(60) Provisional application No. 62/455,524, filed on Feb. 6, 2017, provisional application No. 62/455,350, filed on Feb. 6, 2017.

(51) Int. Cl.
*H04W 24/10* (2009.01)
*H04L 5/00* (2006.01)

(52) U.S. Cl.
CPC .......... *H04W 24/10* (2013.01); *H04L 5/0057* (2013.01)

(58) Field of Classification Search
CPC ................ H01L 24/13; H01L 24/05; H01L 2224/05686; H01L 2224/05624;
(Continued)

(56) References Cited

U.S. PATENT DOCUMENTS

2014/0369291 A1    12/2014   Zhang et al.
2015/0098410 A1*   4/2015    Jongren ................ H04L 1/0026
                                                                370/329
(Continued)

FOREIGN PATENT DOCUMENTS

CN    103516464 A    1/2014
CN    103918208 A    7/2014
(Continued)

OTHER PUBLICATIONS

Indian First Examination Report dated Nov. 26, 2020 issued in corresponding Indian Patent Application No. 201947031119, consisting of 6 pages.
(Continued)

*Primary Examiner* — Walli Z Butt
*Assistant Examiner* — Thad N Defauw
(74) *Attorney, Agent, or Firm* — Christopher & Weisberg, P.A.

(57) ABSTRACT

Methods, base stations and wireless devices for dynamic indication of channel state information (CSI) resources are provided. According to one aspect, a method for a wireless device for determining a channel state information reference symbol, CSI-RS, resource set indicated by a base station is provided. The method includes determining a CSI-RS
(Continued)

resource set based on an indication of a CSI report setting. The CSI report setting has a one-to-one correspondence to a CSI-RS resource set.

16 Claims, 21 Drawing Sheets

(58) Field of Classification Search
CPC ..... H01L 2224/13166; H01L 2224/056; H01L 2924/3512; H01L 2224/13124; H01L 2224/05644; H01L 2224/11464; H01L 2224/13144; H01L 2224/13186; H01L 2224/13113; H01L 2224/13116; H01L 2224/13139; H01L 2224/13147; H01L 2224/05124; H01L 2224/05147; H01L 2224/05647; H01L 2224/05572; H01L 2224/11462; H01L 2224/05144; H01L 2224/03464; H01L 2224/05027; H01L 2224/81815; H01L 2224/03462; H01L 2924/35121; H01L 2224/0401; H01L 2224/10126; H01L 2224/0557; H01L 2224/05025; H01L 2224/13082; H01L 2224/13027; H01L 2224/13014; H01L 2224/05012; H01L 2224/05552; H01L 2224/05555; H01L 2224/05015; H04W 24/10; H04L 5/0057; H04L 25/0226; H04L 5/0064; H04L 5/0094; H04L 5/005; H04L 1/0026; H04B 7/0684; H04B 7/0645; H01B 13/221; H01B 7/292; H01B 13/0016; H01B 13/148; H01B 7/0283; H01B 7/285; H01B 13/14; Y02A 30/14

See application file for complete search history.

(56) References Cited

U.S. PATENT DOCUMENTS

| 2016/0080052 | A1* | 3/2016 | Li ........................ | H04B 7/0456 |
| | | | | 375/267 |
| 2016/0105817 | A1 | 4/2016 | Frenne et al. | |
| 2016/0143055 | A1 | 5/2016 | Nammi et al. | |
| 2016/0149679 | A1 | 5/2016 | Frenne et al. | |
| 2016/0301505 | A1 | 10/2016 | Furuskog et al. | |
| 2016/0359538 | A1 | 12/2016 | Onggosanusi et al. | |
| 2018/0062724 | A1* | 3/2018 | Onggosanusi ........ | H04L 5/0048 |
| 2019/0334601 | A1* | 10/2019 | Han ..................... | H04B 7/0632 |
| 2019/0379503 | A1* | 12/2019 | Kang .................... | H04B 7/088 |

FOREIGN PATENT DOCUMENTS

| CN | 104081813 A | 10/2014 |
| CN | 104321976 A | 1/2015 |
| CN | 104428997 A | 3/2015 |
| CN | 106170942 A | 11/2016 |
| EP | 2800290 A1 | 5/2014 |
| EP | 2 899 909 A1 | 7/2015 |
| JP | 2015-519804 A | 7/2015 |
| WO | 2014/048189 A1 | 4/2014 |
| WO | 2016/056970 A1 | 4/2016 |
| WO | 2016/169304 A1 | 10/2016 |

OTHER PUBLICATIONS

International Search Report and Written Opinion of the International Searching Authority dated Apr. 28, 2018 issued in PCT Application No. PCT/IB2018/050745, consisting of 19 pages.
Written Opinion of the International Preliminary Examining Authority dated Jan. 25, 2019 issued in PCT Application No. PCT/IB2018/050745, consisting of 10 pages.
Notification of Transmittal of the International Preliminary Report on Patentability issued in PCT Application No. PCT/IB2018/050745, consisting of 40 pages.
3GPP TR 38.802 V1.0.0 (Nov. 2016) 3rd Generation Partnership Project; Technical Specification Group Radio Access Network; Study on Radio (NR) Access Technology Physical Layer Aspects (Release 14) consisting of 64 pages.
3GPP TS 36.211 V14.0.0 (Sep. 2016) 3rd Generation Partnership Project; Technical Specification Group Radio Access Network; Evolved Universal Terrestrial Radio Access (E-UTRA); Physical Channels and Modulation (Release 14) consisting of 170 pages.
3GPP TS 36.211 V14.1.0 (Dec. 2016) 3rd Generation Partnership Project; Technical Specification Group Radio Access Network; Evolved Universal Terrestrial Radio Access (E-UTRA); Physical Channels and Modulation (Release 14) consisting of 175 pages.
3GPP TS 36.212 V14.0.0 (Sep. 2016) 3rd Generation Partnership Project; Technical Specification Group Radio Access Network; Evolved Universal Terrestrial Radio Access (E-UTRA); Multiplexing and Channel Coding (Release 14) consisting of 148 pages.
3GPP TS 36.213 V14.0.0 (Sep. 2016) 3rd Generation Partnership Project; Technical Specification Group Radio Access Network; Evolved Universal Terrestrial Radio Access (E-UTRA); Physical Layer Procedures (Release 14) consisting of 406 pages.
3GPP TS 36.213 V14.1.0 (Dec. 2016) 3rd Generation Partnership Project; Technical Specification Group Radio Access Network; Evolved Universal Terrestrial Radio Access (E-UTRA); Physical Layer Procedures (Release 14) consisting of 414 pages.
3GPP TS 36.321 V14.0.0 (Sep. 2016) 3rd Generation Partnership Project; Technical Specification Group Radio Access Network; Evolved Universal Terrestrial Radio Access (E-UTRA); Medium Access Control (MAC) Protocol Specification (Release 14) consisting of 96 pages.
Huawei, HiSilicon 3GPP TSG RAN WG1 Meeting #87 R1-1611237; Title: "On the Need for More Flexible Configurations Related to CSI Reporting"; Agenda Item: 7.1.3.3; Document for: Discussion and Decision; Reno, Nov. 14-18, 2016, consisting of 6 pages.
3GPP TS 36.211 V12.5.0 (Mar. 2015) 3rd Generation Partnership Project; Technical Specification Group Radio Access Network; Evolved Universal Terrestrial Radio Access (E-UTRA); Physical Channels and Modulation (Release 12) consisting of 136 pages.
Japanese Office Action and machine English translation dated Oct. 30, 2020 issued in corresponding Japanese Patent Application No. 2019-542157, consisting of 14 pages.
Korean Preliminary Rejection and English translation thereof, dated Nov. 12, 2020 issued in corresponding Korean Patent Application No. 10-2019-7026334, consisting of 12 pages.
Intel Corporation; 3GPP TSG-RAN WG1 NR Ad-Hoc Meeting Spokane, USA, Jan. 16-20, 2017; R1-1700344; Title: On NR CSI Acquisition Signaling; Agenda Item: 5.1.2.2; Document for: Discussion and Decision, consisting of 5 pages.
Chinese First Office Action and Summary English Translation of the Chinese Office Action dated Aug. 6, 2021 Issued in corresponding Chinese Patent Application No. 2018800233898, consisting of 22 pages.
R1-17xxxxx 3GPP TSG RAN WG1 Meeting #88bis; WF on Beam Reporting; CATT, Intel; Agenda: 8.1.2.2.1; Spokane, USA Apr. 3-7, 2017, consisting of 7 pages.
R1-154378 3GPP TSG RAN WG1 Meeting #82; Title: Discussion on CSI Process and CSI-RS Resource Definitions; Source: ZTE; Agenda Item: 7.2.5.1.2; Document for: Discussion and Decision; Beijing, China, Aug. 24-28, 2015, consisting of 6 pages.
R1-1611241 3GPP TSG RAN WG1 Meeting #87; Title: DL CSI-RS Design for NR CSI Acquisition; Source: Huawei, HiSilicon; Agenda Item: 7.1.3.2; Document for: Discussion and Decision; Reno, USA, Nov. 14-18, 2016, consisting of 7 pages.
R1-1700224 3GPP TSG RAN WG1 AH_NR Meeting; Title: Discussion on CSI Reporting in NR; Source: CATT; Agenda Item: 5.1.2.2; Document for: Discussion and Decision; Spokane, USA, Jan. 16-20, 2017, consisting of 4 pages.
Extended European Search Report dated Jun. 7, 2022 issued in corresponding European Patent Application No. 21203911.9, consisting of 12 pages.

(56) References Cited

OTHER PUBLICATIONS

Chinese Office Action and English summary of the Chinese Office Action dated Jun. 13, 2022 issued in corresponding Chinese Patent Application No. 201880023389.8, consisting of 17 pages.
3GPP TSG RAN WG1 Meeting #81; R1-153256; Source: MediaTek Inc.; Title: Considerations on CSI Feedback in LAA; Agenda Item: 6.2.4.3; Document for: Discussion; Fukuoka, Japan, May 25-29, 2015, consisting of 5 pages.
3GPP TSG RAN WG1 Meeting #82; R1-153946; Source: CATT; Title: CSI Feedback for Beamformed CSI-RS on PUSCH; Agenda Item: 7.2.5.3.2; Document for: Discussion and Decision; Beijing, China, Aug. 24-28, 2015, consisting of 3 pages.
Indian Office Action dated Sep. 5, 2022 issued in corresponding Indian Application No. 202148022370, consisting of 7 pages.

* cited by examiner

DYNAMIC INDICATION FOR CHANNEL STATE INFORMATION FEEDBACK

CROSS-REFERENCE TO RELATED APPLICATIONS

This application is a Submission Under 35 U.S.C. § 371 for U.S. National Stage Patent Application of International Application No.: PCT/IB2018/050745, filed Feb. 6, 2018 entitled "DYNAMIC INDICATION FOR CHANNEL STATE INFORMATION FEEDBACK," which claims priority to U.S. Provisional Application No. 62/455,350, filed Feb. 6, 2017, entitled "METHOD OF DYNAMIC INDICATION FOR CSI FEEDBACK," and U.S. Provisional Application No. 62/455,524, filed Feb. 6, 2017, entitled "METHOD OF DYNAMIC INDICATION FOR CSI FEEDBACK" the entireties of all of which are incorporated herein by reference.

FIELD

This disclosure relates to wireless communications, and in particular, to dynamic indication for channel state information (CSI) feedback.

BACKGROUND

The fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although different terms may be specified in 5G. A general description of the agreements on 5G New Radio (NR) Access Technology so far is contained in 3GPP TR 38.802 V1.0.0 (2016-11). Final specifications may be published inter alia in the future 3GPP TS 38.3 and/or 38.2 series.

The next generation mobile wireless communication system such as fifth generation (5G) or new radio (NR), will support a diverse set of use cases and a diverse set of deployment scenarios. The later includes deployment at both low frequencies (100s of MHz), similar to long term evolution (LTE) today, and very high frequencies (mm waves in the tens of GHz). At high frequencies, propagation characteristics make achieving good coverage challenging. One solution to the coverage issue is to employ high-gain beamforming, typically facilitated by analog circuitry, in order to achieve satisfactory link budget. Beamforming will also be used at lower frequencies (typically digital beamforming using mainly digital circuitry), and is expected to be similar in nature to the already standardized third generation partnership project (3GPP) LTE system (4G).

Of particular relevance is Section 6.10.5 of the 3GPP standard TS 36.211 V14.1.0 (2016-12) which relates to the channel state information reference signal (CSI-RS). A similar signal is expected to be designed also for NR, and is a subject of this disclosure.

Note that terminology used here such as New Radio node B (gNB) and wireless device (WD) should be considered non-limiting and does not imply a certain hierarchical relation between the two; in general, "gNB" could be read as a reference to generic device 1 and "WD" as device 2, wherein these two generic devices may communicate with each other over some radio channel. Alternatively, other terminology such as "gNodeB", "eNodeB" and "eNB" can be used in place of "gNB" in different communication systems.

LTE and NR use orthogonal frequency division multiplexing (OFDM) in the downlink and discrete Fourier transform (DFT)-spread OFDM or OFDM in the uplink. The basic LTE or NR downlink physical resource can thus be seen as a time-frequency grid as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also referred to as different numerologies) in NR are given by $\Delta f=(15\times2^\alpha)$ kHz where $\alpha$ is a non-negative integer.

In the time domain, LTE downlink transmissions are organized into radio frames of 10 ms, each radio frame consisting of ten equally-sized subframes of length $T_{subframe}=1$ ms which is shown in FIG. 2. A similar frame structure may also be used in NR, in which the subframe length is fixed at 1 ms regardless of the sub-carrier spacing used. The number of slots per subframe depends on the subcarrier spacing configured. The slot duration for $(15\times\alpha^2)$ kHz subcarrier spacing is given by $1/\alpha^2$ ms assuming 14 OFDM symbols per slot.

Furthermore, the resource allocation in LTE is typically described in terms of resource blocks, where a resource block (RB) corresponds to one slot (0.5 ms) in the time domain and 12 contiguous subcarriers in the frequency domain. Resource blocks are numbered in the frequency domain, starting with 0 from one end of the system bandwidth. In NR, resource allocation in the time domain can be in units of slots (i.e., slot-based transmission) or in units of length less than a slot (i.e., non-slot-based transmission).

Downlink transmissions are dynamically scheduled, i.e., in each subframe the gNB transmits control information concerning which terminal's data is transmitted, and upon which resource blocks the data is transmitted, in the current downlink subframe. This control signaling is typically transmitted in the first 1, 2, 3 or 4 OFDM symbols in each subframe in LTE and 1 or 2 OFDM symbols in NR. A downlink system with 3 OFDM symbols as control for LTE is illustrated in FIG. 3.

Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

NR is currently evolving with MIMO support. A core component in NR is the support of MIMO antenna deployments and MIMO related techniques including beamforming at higher carrier frequencies. Currently LTE and NR support an 8-layer spatial multiplexing mode for up to 32 transmit (Tx) antennas with channel dependent precoding. The spatial multiplexing mode is aimed for high data rates in favorable channel conditions. An illustration of the spatial multiplexing operation is provided in FIG. 4.

As seen in FIG. 4, the information carrying symbol vector s is multiplied by an $N_T\times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE and NR use OFDM in the downlink and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder, W, can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the WD. In addition, the precoder matrix may also be selected to strive for orthogonalizing the channel, meaning that after proper linear equalization at the WD, the inter-layer interference is reduced.

The transmission rank, and thus the number of spatially multiplexed layers, is reflected in the number of columns of the precoder. For efficient performance, a transmission rank that matches the channel properties should be selected.

Codebook Based Channel State Information (CSI) Estimation and Feedback

In LTE's closed loop MIMO transmission schemes such as transmission mode 9 and transmission mode 10, a WD estimates and feeds back the downlink CSI to the eNodeB. The eNB uses the feedback CSI to transmit downlink data to the WD. The CSI consists of a transmission rank indicator (RI), a precoding matrix indicator (PMI) and a channel quality indicator(s) (CQI). A codebook of precoding matrices is used by the WD to find out the best match between the estimated downlink channel $H_n$ and a precoding matrix in the codebook based on certain criteria, for example, the WD throughput. The channel $H_n$ is estimated based on a Non-Zero Power CSI reference signal (NZP CSI-RS) transmitted in the downlink for transmission mode 9 and transmission mode 10.

The CQI/RI/PMI together provide the downlink channel state to the WD. This is also referred to as implicit CSI feedback since the estimation of $H_n$ is not fed back directly. The CQI/RI/PMI can be wideband or subband depending on which reporting mode is configured.

The RI corresponds to a recommended number of streams that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size (i.e., code rate) and LTE supports transmission of one or two simultaneous (on different layers) transmissions of transport blocks (i.e. separately encoded blocks of information) to a WD in a subframe. There is thus a relation between a CQI and a signal to interference plus noise ratio (SINR) of the spatial stream(s) over which the transport block or blocks are transmitted.

Codebooks of up to 16 antenna ports have been defined in LTE Up to Release 13. Both one dimension (1D) and two-dimension (2D) antenna arrays are supported. For LTE Release 12 and earlier, only a codebook feedback for a 1-dimensional (1D) port layout is supported, with 2, 4 or 8 antenna ports. Hence, the codebook is designed assuming these ports are arranged on a straight line in one dimension.

In LTE Rel-13, codebooks for two dimensional (2D) port layouts were specified for the case of 8, 12, or 16 antenna ports. In addition, a codebook for 1D port layout for the case of 16 antenna ports was also specified in LTE Rel-13. In LTE Rel-14, the 1D and 2D codebooks are extended up to 32 port (specifically, 20, 24, 28, and 32 port 1D and 2D codebooks are supported in LTE Rel-14).

In LTE Rel-13, two types of CSI reporting were introduced, i.e., Class A and Class B. In Class A CSI reporting, a WD measures and reports CSI based on a new codebook for the configured 2D antenna array with 8, 12 or 16 antenna ports. The Class A codebook is defined by five parameters, i.e. (N1, N2, Q1, Q2, CodebookConfig), where (N1, N2) are the number of antenna ports in a first and a second dimension, respectively. (Q1, Q2) are the DFT oversampling factor for the first and the second dimension, respectively. CodebookConfig ranges from 1 to 4 and defines four different ways the codebook is formed. For CodebookConfig=1, a precoding matrix indicator (PMI) corresponding to a single 2D beam is fed back for the whole system bandwidth while for CodebookConfig={2, 3, 4}, PMIs corresponding to four 2D beams are fed back and each subband may be associated with a different 2D beam. The CSI consists of a rank indicator (RI), a PMI and a channel quality indicator (CQI) or CQIs, similar to the CSI reporting in pre Rel-13.

In Class B CSI reporting, in one scenario (also referred to as "$K_{(CSI-RS)} > 1$"), the eNB may pre-form multiple beams in one antenna dimension. There can be multiple ports (1, 2, 4, or 8 ports) within each beam on the other antenna dimension. "Beamformed" CSI-RS are transmitted along each beam. A WD first selects the best beam from a group of beams configured and then measures CSI within the selected beam based on the Pre-Release-13 LTE codebook for 2, 4, or 8 ports. The WD then reports back the selected beam index and the CSI corresponding to the selected beam. In another scenario (also referred to as "$K_{(CSI-RS)=1}$"), the eNB may form up to 4 (2D) beams on each polarization and "beamformed" CSI-RS is transmitted along each beam. A WD measures CSI on the "beamformed" CSI-RS and feedback CSI based on a new Class B codebook for 2, 4, or 8 ports.

Channel State Information Reference Symbols (CSI-RS)

In LTE and NR, a reference symbol sequence is introduced for the intent to estimate channel state information, the CSI-RS. The CSI-RS provides several advantages over basing the CSI feedback on the common reference symbols (CRS) which were used, for that purpose, in previous releases of LTE. First, the CSI-RS is not used for demodulation of the data signal, and thus does not require the same density as CRS (i.e., the overhead of the CSI-RS is substantially less). Second, CSI-RS provides a much more flexible means to configure CSI feedback measurements (e.g., which CSI-RS resource to measure on can be configured in a WD specific manner).

By measuring on a CSI-RS, a WD can estimate the effective channel the CSI-RS is traversing including the radio propagation channel and antenna gains. In more mathematical rigor this implies that if a known CSI-RS signal X is transmitted, a WD can estimate the coupling between the transmitted signal and the received signal (i.e., the effective channel). Hence if no virtualization is performed in the transmission, the received signal y can be expressed as:

$$y = Hx + e$$

and the WD can estimate the effective channel H. Up to 32 CSI-RS ports can be configured for a LTE or NR WD. That is, the WD can estimate the channel from up to thirty-two transmit antenna ports.

An antenna port is equivalent to a reference signal resource that the WD uses to measure the channel. Hence, base station such as a gNB with two antennas could define two CSI-RS ports, where each port is a set of resource elements in the time frequency grid within a subframe or slot. The base station transmits each of these two reference signals from each of the two antennas so that the WD can measure the two radio channels and report channel state information back to the base station based on these measurements. In LTE, CSI-RS resources with 1, 2, 4, 8, 12, 16, 20, 24, 28 and 32 ports is supported.

In LTE, the CSI-RS utilizes an orthogonal cover code (OCC) of length two to overlay two antenna ports on two consecutive resource elements (REs). More particularly, FIGS. 5A-5C illustrate resource element grids over a resource block (RB) pair showing potential positions for Release 9/10 WD-specific RS, CSI-RS (marked with a number corresponding to the CSI-RS antenna port), and CRS. As shown in FIGS. 5A-5C, many different CSI-RS patterns are available. For the case of 2 CSI-RS antenna ports, FIG. 5A shows that there are 20 different patterns within a subframe. As shown in FIGS. 5B and 5C, the corresponding number of patterns is 10 and 5 for 4 and 8 CSI-RS antenna ports, respectively. For TDD, some additional CSI-RS patterns are available. Furthermore, LTE supports additional OCC lengths of four and eight to support full power utilization in the case of larger number of CSI-RS ports. Length 4 OCC is supported when the number of CSI-RS ports is equal or greater than 12. Length 8 OCC is supported when the number of CSI-RS ports is either 24 or 32.

The CSI reference signal configurations are given by Table 1, taken from 3GPP LTE specifications TS 36.211 v.12.5.0. For example, the CSI RS configuration 5 for 4 antennas ports use (k',l')=(9,5) in slot 1 (the second slot of the subframe), and using the formulas below it follows that port 15, 16, use OCC over the resource elements (k,l)=(9, 5), (9, 6) and port 17, 18 use OCC over resource elements (3, 5) (3, 6) respectively (assuming physical resource block (PRB) index m=0), where k is the subcarrier index and l is the OFDM symbol index.

TABLE 1

| | | Number of CSI reference signals configured | | | | | |
|---|---|---|---|---|---|---|---|
| CSI reference signal configuration | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The orthogonal cover code (OCC) is introduced below by the factor $w_{l''}$ $$k = k' + 12m + \begin{cases} -0 \text{ for } p \in \{15, 16\}; \text{ normal cyclic prefix} \\ -6 \text{ for } p \in \{17, 18\}; \text{ normal cyclic prefix} \\ -1 \text{ for } p \in \{19, 20\}; \text{ normal cyclic prefix} \\ -7 \text{ for } p \in \{21, 22\}; \text{ normal cyclic prefix} \\ -0 \text{ for } p \in \{15, 16\}; \text{ extended cyclic prefix} \\ -3 \text{ for } p \in \{17, 18\}; \text{ extended cyclic prefix} \\ -6 \text{ for } p \in \{19, 20\}; \text{ extended cyclic prefix} \\ -9 \text{ for } p \in \{21, 22\}; \text{ extended cyclic prefix} \end{cases}$$

-continued $$l = l' + \begin{cases} l'' & CSI \text{ reference signal configurations } 0-19, \text{ normal cyclic prefix} \\ 2l'' & CSI \text{ reference signal configurations } 20-31, \text{ normal cyclic prefix} \\ l'' & CSI \text{ reference signal configurations } 0-27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Two types of CSI-RS can be defined: non-zero power (NZP) CSI-RS and zero power (ZP) CSI-RS. NZP CSI-RS is transmitted by a network node (or gNB) for WDs to estimate the downlink channels to the network node. While for ZP CSI-RS, one or more CSI-RS resource(s) is/are allocated by the network node but nothing is transmitted on the resources, which can be used to reduce interferences to neighbor cells so that better channel estimation can be performed by the WDs in the neighbor cells.

In NR, the following three types of CSI-RS transmissions are supported:

Aperiodic CSI-RS Transmission: This is a one-shot CSI-RS transmission that can happen in any subframe or slot. Here, one-shot means that CSI-RS transmission only happens once per trigger in one slot or subframe. The CSI-RS resources (i.e., the resource element locations which consist of subcarrier locations and OFDM symbol locations) for aperiodic CSI-RS are preconfigured to WDs via higher layer signaling. The transmission of aperiodic CSI-RS is triggered by dynamic signaling.

Periodic CSI-RS Transmission: These CSI-RS transmissions are preconfigured by higher layer signaling and the pre-configuration includes parameters such as periodicity and subframe offset similar to LTE. Periodic CSI-RS is controlled by higher layer signaling only and dynamic signaling is not needed to trigger periodic CSI-RS transmission. That is, the periodic CSI-RS transmission starts following radio resource control (RRC) configuration following the configured parameters.

Semi-Persistent CSI-RS Transmission: Similar to periodic CSI-RS, resources for semi-persistent CSI-RS transmissions are preconfigured via higher layer signaling with parameters such as periodicity and subframe offset. However, unlike periodic CSI-RS, a dynamic allocation signaling is needed to begin transmission of semi-persistent CSI-RS on the preconfigured resources. Furthermore, as shown in FIG. 6, semi-persistent CSI-RS is transmitted for a limited time duration (which may be referred to as the time duration when semi-persistent CSI-RS is allocated). In some cases, a dynamic deallocation signaling is needed to stop transmission of semi-persistent CSI-RS.

In addition to multiple types of CSI-RS transmissions, NR also supports multiple types of CSI reporting. The following types of CSI reporting will be supported in NR:

Aperiodic CSI Reporting: This type of CSI reporting involves a single-shot (i.e., one time) CSI report by the WD which is dynamically triggered by the gNB.

Periodic CSI Reporting: CSI is reported periodically by the WD. Parameters such as periodicity and subframe offset are configured by higher layer signaling.

Semi-Persistent CSI Reporting: similar to periodic CSI reporting, semi-persistent CSI reporting has a periodicity and subframe offset. However, a dynamic trigger may be needed to begin semi-persistent CSI reporting. In some cases, a dynamic trigger may be needed to stop the semi-persistent CSI reporting.

With regards to relating the different CSI-RS types to the different CSI reporting types, the combinations that will be supported in NR are shown in Table 2.

TABLE 2

Combinations of CSI-RS types and CSI reporting types supported in NR

|  | Aperiodic CSI Reporting | Semi-Persistent CSI Reporting | Periodic CSI Reporting |
| --- | --- | --- | --- |
| Aperiodic CSI-RS | Supported | Not Supported | Not Supported |
| Semi-Persistent CSI-RS | Supported | Supported | Not Supported |
| Periodic CSI-RS | Supported | Supported | Supported |

Interference Measurement Resources (IMRs)

In LTE, interference measurement resource (IMR) was introduced in transmission mode 10 which gives the benefit that the CSI measurement is better defined compared to other transmission modes (for instance transmission mode 9) where interference measurements are undefined. This gives a performance enhancement of transmission Mode 10 over the other transmission modes.

IMR based on ZP CSI-RS is already supported in LTE. ZP CSI-RS based IMR is typically used for non-coherent interference measurement where the WD measures the interference power on the IMR. Such interference power measurements based on ZP CSI-RS are useful in most cases except those involving some use cases such as MU-MIMO (i.e., transmission of data to multiple WDs in the same resource), coordinated multi-point (COMP) (i.e., transmission of data to a WD from one or more coordinated transmitters), etc. In some cases, coherent interference measurement is useful where the WD measures the interferer's channel. A potential use case is accurate interference estimation to suppress interference from dominant interferers. An IMR based on NZP CSI-RS is well suited for such coherent interference measurement. In NR, two types of IMRs based on ZP CSI-RS and NZP CSI-RS are likely to be supported.

Efficient mechanisms for channel state information (CSI) feedback are needed.

SUMMARY

Some embodiments advantageously provide methods, base stations and wireless devices for using control signaling for dynamic indication of channel state information (CSI) resources. According to one aspect, some embodiments include a method of initiating channel state information, CSI, feedback in a wireless device configured by higher layers with M Report Settings containing parameters related to CSI reporting and N Resource Settings containing parameters defining the resources used for channel measurement and their properties. The method includes a) obtaining preconfigured linkages between the Report Settings and the Resource Settings via higher layer configuration; b) determining S CSI-RS Resources Sets within each Resource Setting based on higher layer configuration wherein a CSI-RS Resource Set contains multiple CSI-RS resources used for channel measurement; c) receiving via higher layer configuration a Preconfigured correspondence between one of the S CSI-RS Resources Sets within one of the Resource Settings and a part or whole of a CSI Report Setting that is linked to the Resource Setting using parameter configuration compatibility; and d) receiving a dynamic indication associated with the correspondence between the CSI-RS Resource Set and the CSI Report Setting.

According to another aspect, a method for a wireless device for determining a channel state information reference symbol, CSI-RS, resource set indicated by a base station is provided. The method includes determining a CSI-RS resource set based on an indication of a CSI report setting, the CSI report setting having a one-to-one correspondence to a CSI-RS resource set.

According to another aspect, a wireless device initiating channel state information, CSI, feedback in a wireless device configured by higher layers with M Report Settings containing parameters related to CSI reporting and N Resource Settings containing parameters defining the resources used for channel measurement and their properties, the wireless device comprising processing circuitry configured to perform at least one of: a)
  obtaining preconfigured linkages between the Report Settings and the Resource Settings via higher layer configuration; b) determining S CSI-RS Resources Sets within each Resource Setting based on higher layer configuration wherein a CSI-RS Resource Set contains multiple CSI-RS resources used for channel measurement; c) receiving via higher layer configuration a Preconfigured correspondence between a CSI-RS Resource Set within a Resource Setting and a part or whole of a CSI Report Setting that is linked to the Resource Setting using parameter configuration compatibility; and d) receiving a dynamic indication associated with the correspondence between the CSI-RS Resource Set and the CSI Report Setting.

According to yet another aspect, a wireless device for determining channel state information reference symbol, CSI-RS, resources indicated by a base station, the wireless device (40) comprising processing circuitry configured to determine a CSI-RS resource set based on an indication of a CSI report setting, the CSI-RS report setting having a one-to-one correspondence to a CSI-RS resource set.

According to yet another aspect, a wireless device for determining a channel state information reference symbol, CSI-RS, resources indicated by a base station is provided. The wireless device includes a determination module for determining a CSI-RS resource set based on an indication of a CSI report setting, the CSI-RS report setting having a one-to-one correspondence to a CSI-RS resource set.

According to another aspect, a method for a base station is provided. The method includes sending, to the wireless device, a dynamic indication of a CSI report setting and one or more CSI-RS resources, wherein a one-to-one correspondence between a CSI report setting and a CSI-reference symbol, RS, resource set is established.

According to another aspect, a base station using control signaling for dynamic indication of channel state information, CSI, resources to a wireless device is provided. The base station includes processing circuitry configured to send to the wireless device, an indication of the CSI report setting and the CSI-RS resources, wherein a one-to-one correspondence between a CSI report setting and a CSI-reference symbol (RS) resource set is established.

According to yet another aspect, a base station for signaling channel state information reference symbol, CSI-RS, resources to be used by a wireless device is provided. The method includes at least one of selecting one or more CSI-RS resource sets; selecting one or more CSI-RS resources in each of the selected CSI-RS resource sets; and selecting the maximum number of CSI-RS resources in a CSI-RS resource set, the selecting of the maximum number calculated to achieve a similarity between numbers of CSI-RS resources in the one or more CSI-RS resource sets.

According to another aspect, a base station for signaling channel state information reference symbol, CRS-RS, resources to be used by a wireless device is provided. The base station includes processing circuitry configured to perform at least one of: selecting one or more CSI-RS resource sets; selecting one or more CSI-RS resources in each of the selected CSI-RS resource sets; and selecting a maximum number of CSI-RS resources in a CSI-RS resource set, the selecting of the maximum number calculated to achieve a similarity between numbers of CSI-RS resources in the one or more CSI-RS resource sets.

According to yet another aspect, a method of initiating channel state information, CSI, feedback in a wireless device configured by higher layers with a CSI Report containing parameters related to CSI reporting is provided. The method includes receiving a dynamic indication associated with a correspondence between the CSI Report and the resources used for channel measurement.

According to another aspect, a method for a wireless device for determining a channel state information reference symbol, CSI-RS, set of resources indicated by a base station. The method includes determining a CSI-RS set of resources based on an indication of a CSI report, the CSI report having a one-to-one correspondence to the CSI-RS set of resources.

According to yet another embodiment, a wireless device configured for initiating channel state information, CSI, feedback, the wireless device being configured by higher layers with a CSI Report containing parameters related to CSI reporting is provided. The wireless device includes a receiver configured to receive a dynamic indication associated with a correspondence between the CSI Report and the resources used for channel measurement.

According to another aspect, a wireless device for determining a channel state information reference symbol, CSI-RS, set of resources indicated by a base station is provided. The wireless device includes processing circuitry configured to determine a CSI-RS set of resources based on an indication of a CSI report, the CSI report having a one-to-one correspondence to the CSI-RS set of resources.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
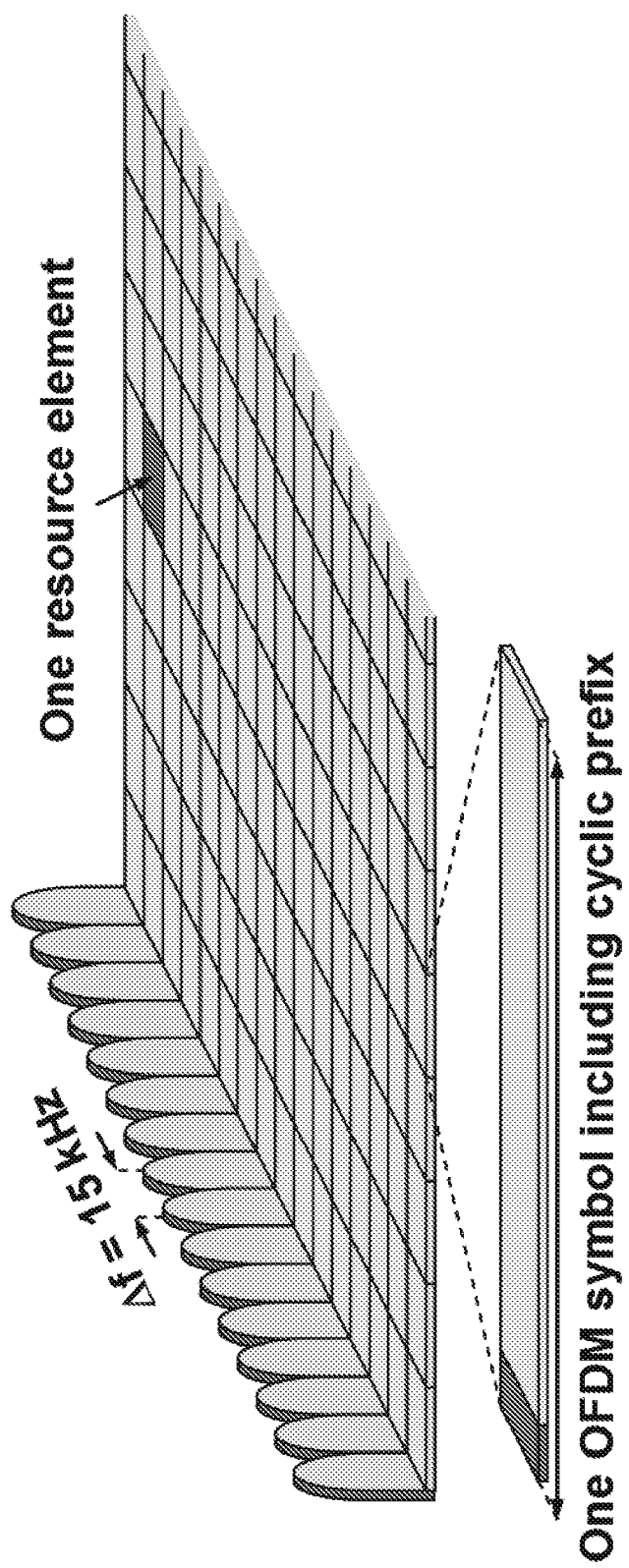
FIG. 1 is a time-frequency grid of resources.
Figure 2:
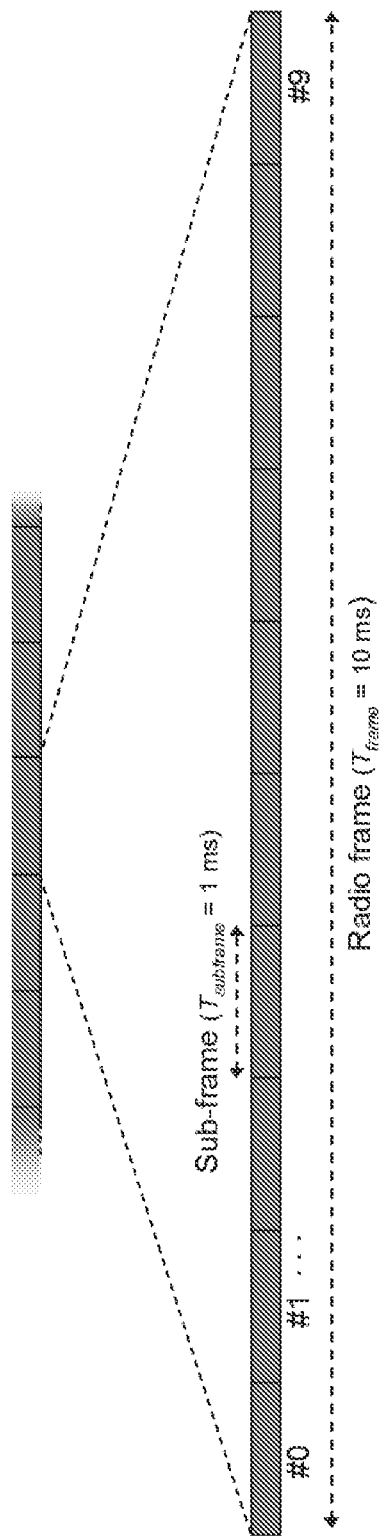
FIG. 2 is radio frame.
Figure 3:
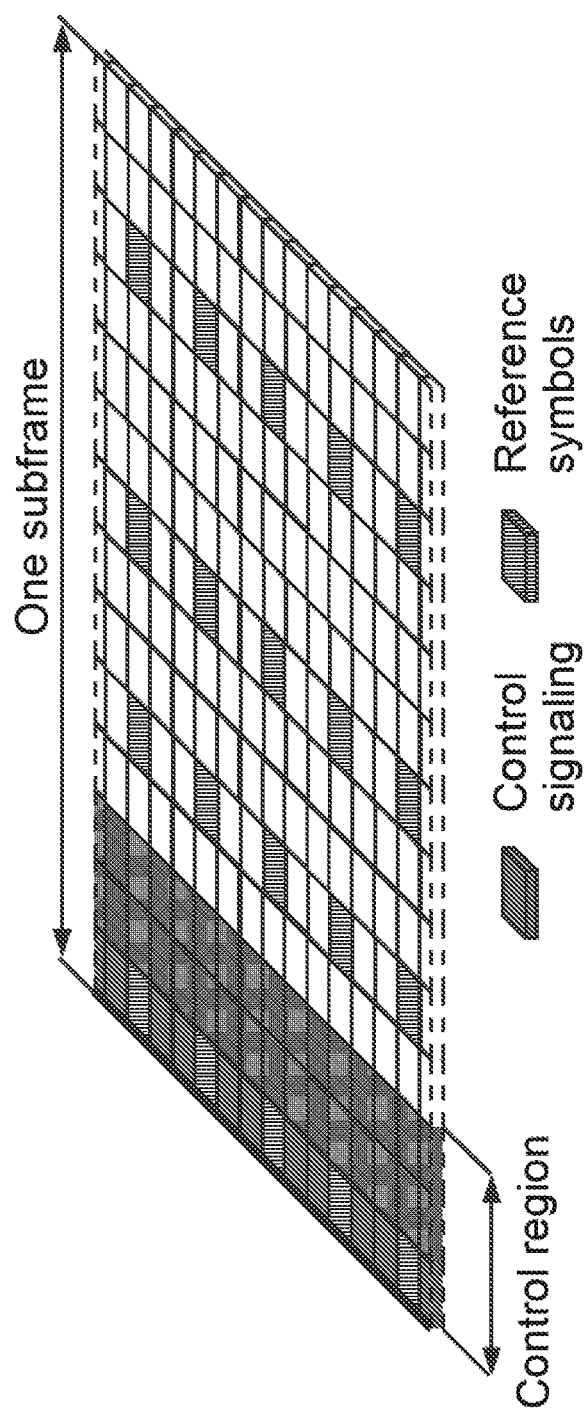
FIG. 3 is an illustration of 3 OFDM symbols.
Figure 4:
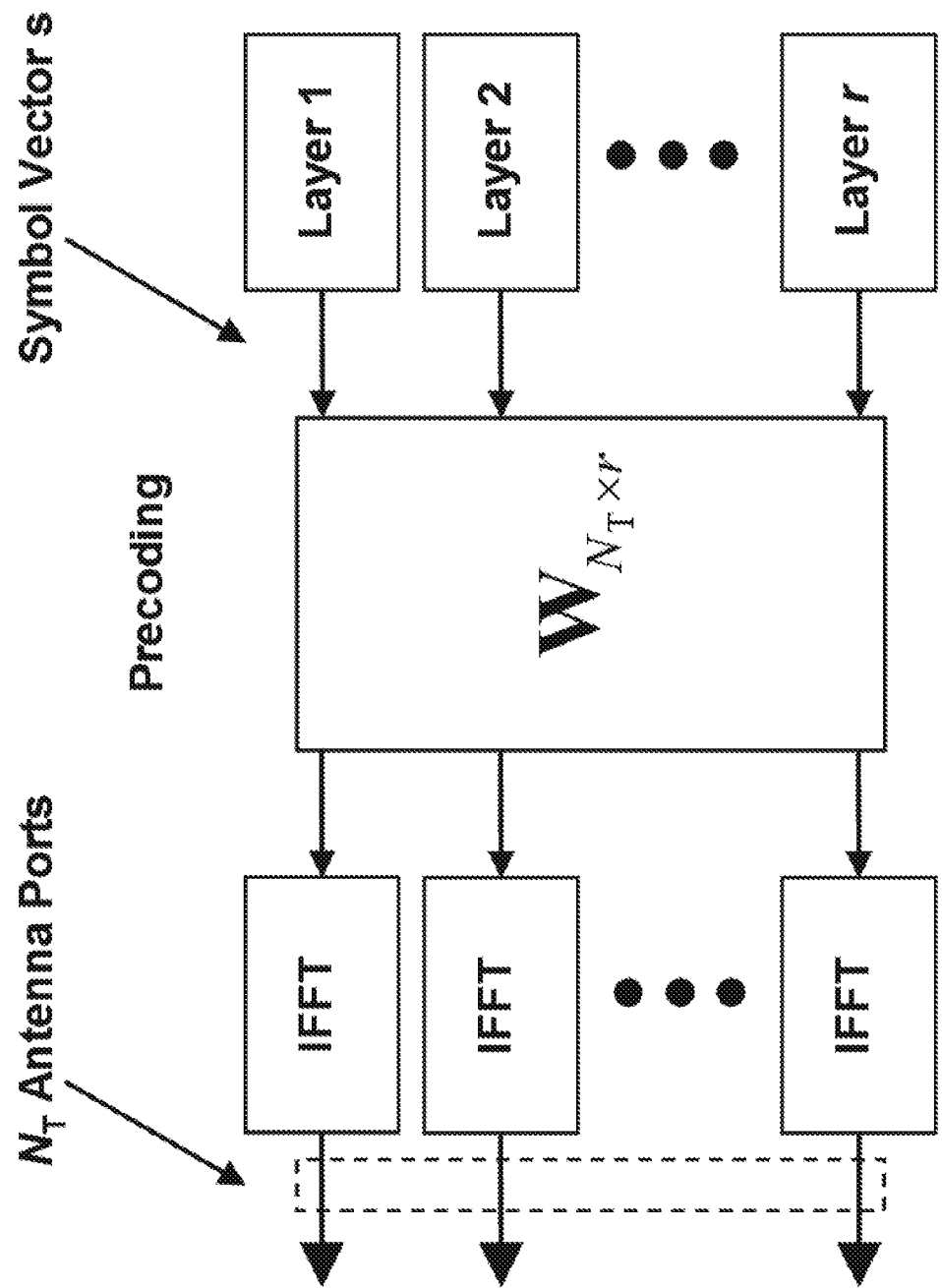
FIG. 4 is an illustration of spatial multiplexing.
Figure 5A:
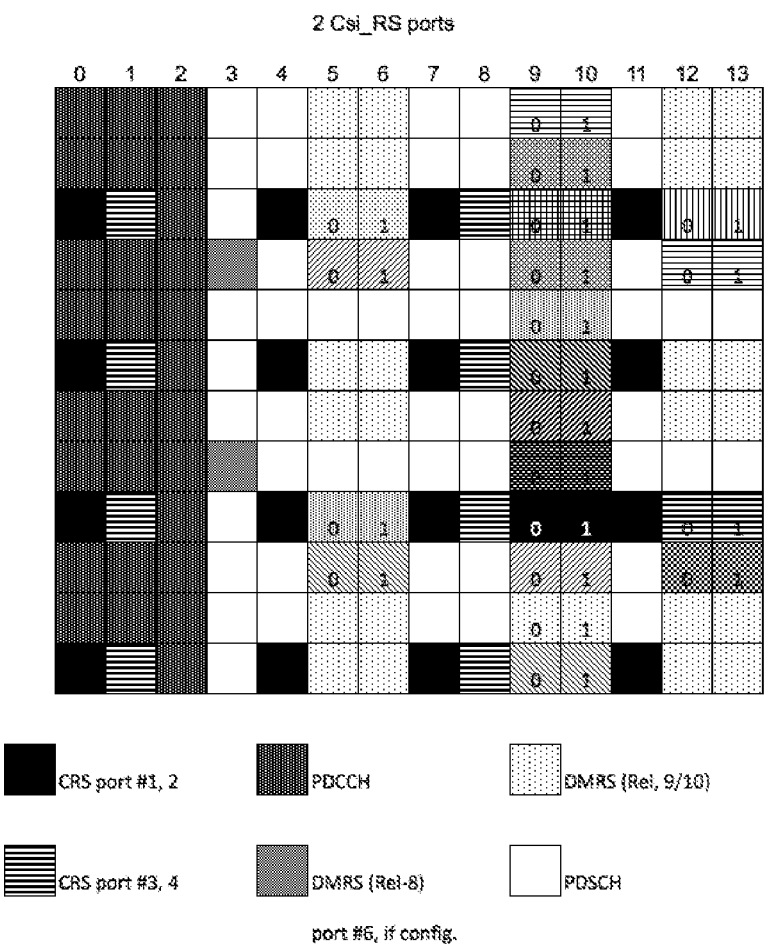
FIG. 5A illustrates a first resource element grid.
Figure 5B:
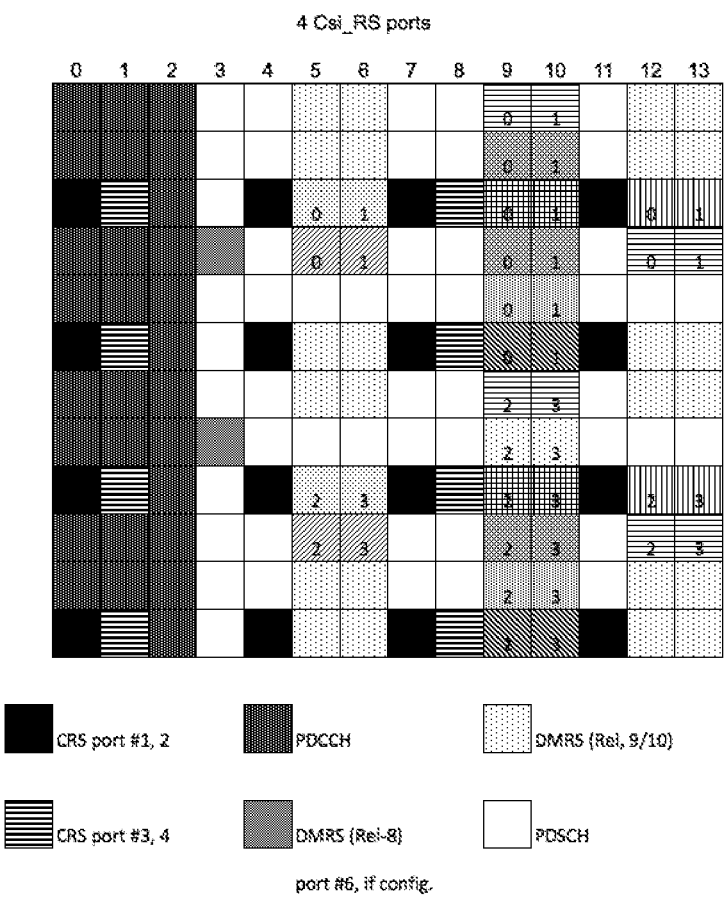
FIG. 5B illustrates a second resource element grid
Figure 5C:
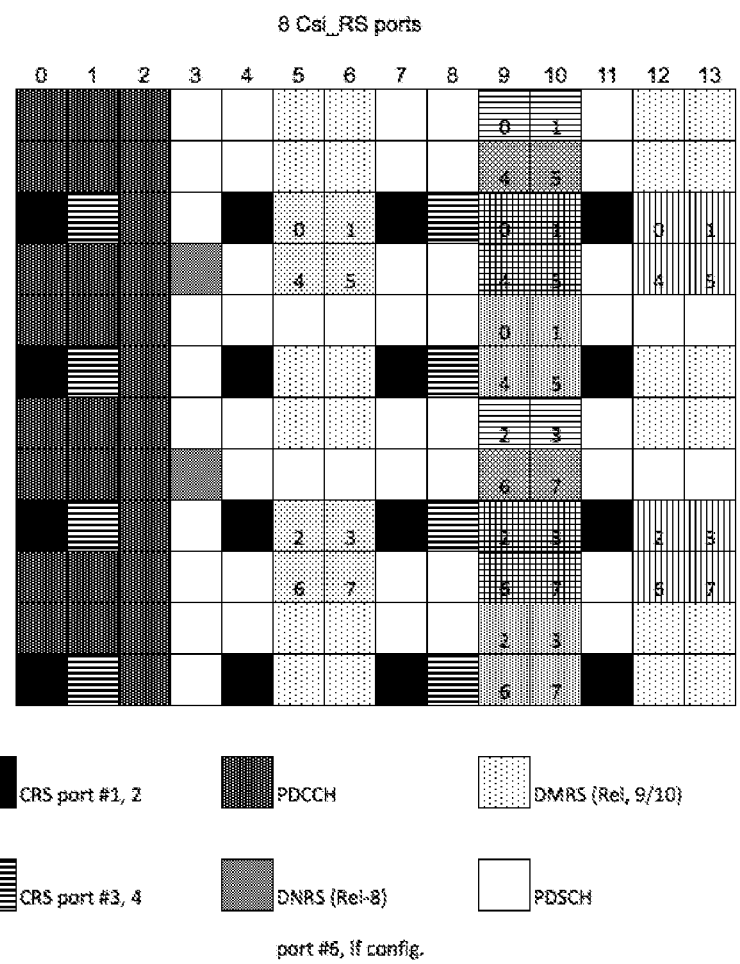
FIG. 5C illustrates a third resource element grid.
Figure 6:
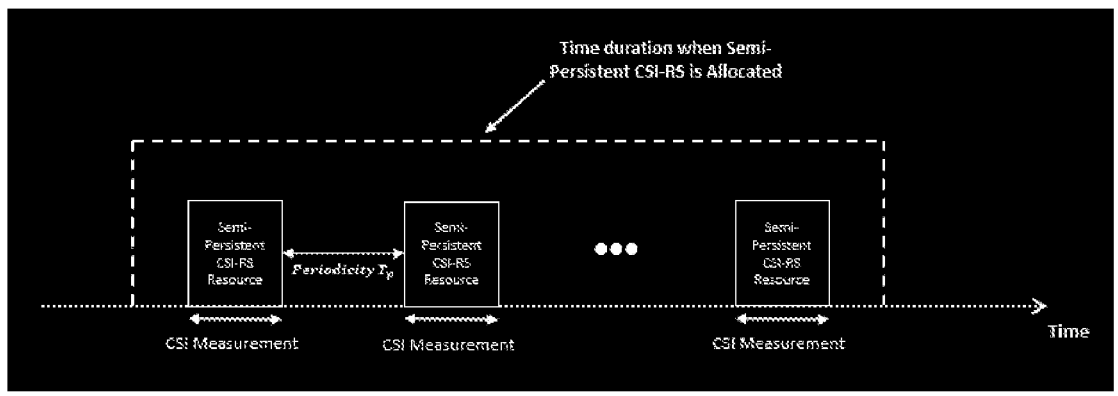
FIG. 6 illustrates semi-persistent CSI-RS.

Before describing in detail exemplary embodiments, it is noted that the embodiments reside primarily in combinations of apparatus components and processing steps related to dynamic indication for channel state information (CSI) feedback. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Herein, the disclosure also focuses on wireless transmissions in the downlink (DL), but the disclosure and concepts provided herein are equally applicable in the uplink (UL).

As used herein, relational terms, such as "first" and "second," "top" and "bottom," and the like, may be used solely to distinguish one entity or element from another entity or element without necessarily requiring or implying any physical or logical relationship or order between such entities or elements.

CSI Framework

Figure 7:
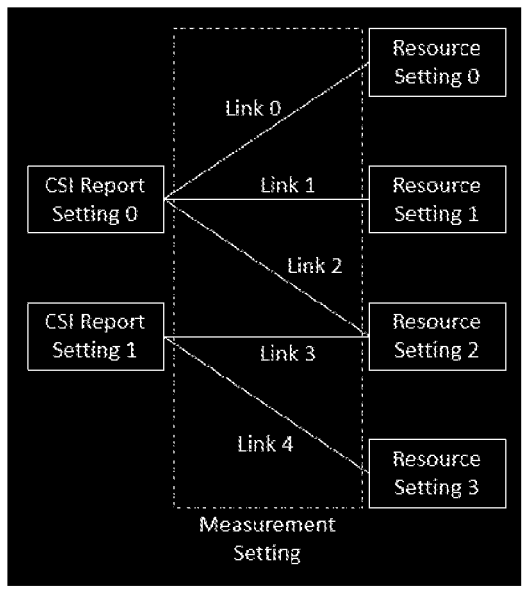
FIG. 7 illustrate an example of a CSI framework.

The CSI framework agreed for NR allows a wide variety of use cases, as well as dynamic reuse of CSI resources. As per the agreed CSI framework, a WD can be configured by higher layers with N≥1 CSI Report Settings, M≥1 Resource settings, and 1 CSI Measurement Setting. The Measurement Setting includes L≥1 links where each link links one Report Setting with one Resource Setting. FIG. 7 shows an example of the agreed CSI framework in NR, where N=2, M=4, and L=5.

Within each CSI Report Setting, a WD is configured (by higher layers) with parameters such as the reported CSI parameter(s), codebook configuration parameters (similar to the ones discussed in section titled 'Codebook Based Channel State Information (CSI) Estimation and Feedback'), time-domain behavior (i.e., periodic, semi-persistent, or aperiodic) of CSI reporting.

Figure 8:
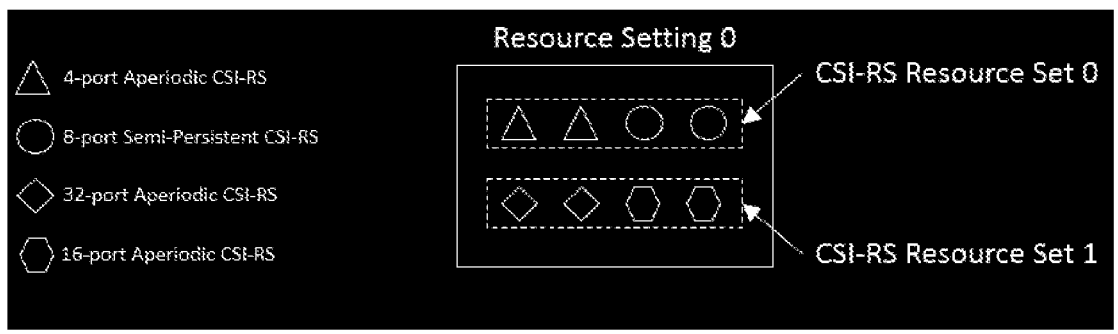
FIG. 8 is an example of resource setting.

Within each Resource Setting, a WD is configured (by higher layers) with a configuration of S≥1 CSI-RS Resource Sets. Within each CSI-RS resource set s, the WD is further configured by higher layers with $K_s \geq 1$ CSI-RS resources where the CSI-RS resources can have different mapping to REs, different number of ports, and different time-domain behavior (i.e., periodic, semi-persistent, or aperiodic). An example Resource Setting with S=2 CSI-RS Resource Sets is shown in FIG. 8. In this example, the two CSI-RS Resource Sets consist of 4 CSI-RS resources each (that is, $K_1$=4 and $K_2$=4). As seen in the example of FIG. 8, the CSI-RS resources within each CSI-RS resource set have a mixed number of ports and time-domain behavior.

The WD is then dynamically indicated with the following if applicable:
  One or more CSI Report Settings selected from within the CSI Measurement Setting
  One or more CSI-RS Resource Sets selected from at least one Resource Setting
  One or more CSI-RS resources selected from at least one CSI-RS resource set.
The different ways of dynamic indication are discussed below under the Section titled "Mechanisms for Control Signaling."

Mechanisms for Control Signaling

LTE control signaling can be carried in a variety of ways, including carrying control information on the physical downlink control channel (PDCCH) or physical uplink control channel (PUCCH), embedded in the physical uplink shared channel (PUSCH), in medium access control (MAC) control elements ('MAC CEs'), or in radio resource control (RRC) signaling. Each of these mechanisms is customized to carry a particular kind of control information.

Control information carried on PDCCH, PUCCH, or embedded in PUSCH is physical layer related control information, such as downlink control information (DCI), uplink control information (UCI), as described in 3GPP TS 36.211, 36.212, and 36.213. DCI is generally used to instruct the WD to perform some physical layer function, providing the needed information to perform the function. UCI generally provides the network with needed information, such as hybrid automated repeat request acknowledgement (HARQ-ACK), scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

Consider a CSI framework with a Measurement Setting which consists of N CSI Report Settings, Resource Settings with S CSI-RS Resource Sets wherein each CSI-RS resource set consists of $K_s$ CSI-RS resources. In this case, dynamic indication for selecting one of the N CSI Report Settings requires $\lceil \log_2(N) \rceil$ bits. Dynamic indication for selecting one CSI-RS Resource Set out of S CSI-RS Resource Sets requires $\lceil \log_2(S) \rceil$ bits. Dynamic indication for selecting one of the CSI-RS resources out of $K_s$ resources requires $\lceil \log_2(K_s) \rceil$ bits. Hence, the total number of bits required for selecting one CSI Report Setting, one CSI-RS resource set, and one CSI-RS resource is $\lceil \log_2(N) \rceil + \lceil \log_2(S) \rceil + \lceil \log_2(K_s) \rceil$ bits. This can amount to a large control signaling overhead for dynamic indication when the values of N, S, and $K_s$ are large. The control signaling overhead for dynamic indication will be even larger when multiple CSI Report Setting, multiple CSI-RS Resource Sets, and multiple CSI-RS resources need to be selected.

Furthermore, not all CSI-RS resources are compatible with all CSI Report Settings. For instance, a CSI-RS resource with 4-ports is not compatible with a CSI report that has a codebook configuration supporting 8-ports (that is, the number of ports should be the same in the CSI-RS resource and the codebook configuration for them to be compatible). In addition, the timing behavior (i.e., periodic, semi-persistent, aperiodic) of the CSI Report Setting has to be compatible with the timing behavior of the CSI-RS resource. It should be noted that only certain timing behavior combinations of CSI-RS resource and CSI reporting are agreed to be supported in NR (see Table 2). Hence, it is an open problem how to efficiently configure the measurement setting so as to minimize the control signaling overhead for dynamic indication.

Another problem with the existing approach is that the WD needs to be dynamically indicated about, i.e., informed of, the selection of three different entities (the three entities are CSI Report Setting, CSI-RS resource set, and CSI-RS resources). This can make the signaling design for dynamic indication complicated.

In a first embodiment (Embodiment A below), the control signaling needed for dynamic indication is minimized by forming a one-to-one correspondence between one CSI Report Setting and a CSI-RS Resource Set contained within a Resource Setting to which the one CSI Report is linked.

In a second embodiment (Embodiment B below), Report Subsets are created within each CSI Report Setting. The control signaling needed for dynamic indication is minimized by forming a one-to-one correspondence between one Report Subset contained within one CSI Report Setting and a CSI-RS Resource Set contained within a Resource Setting to which the one CSI Report is linked.

Advantages of the first embodiment may include that the dynamic indication is simplified and the associated control signaling overhead is minimized. Due to the one-to-one correspondence between a CSI Report Setting and a CSI-RS Resource Set, the selection of the CSI-RS Resource Set can be implicitly inferred from the dynamic indication of the CSI Report Setting. Hence, only two different entities need to be dynamically indicated (the two entities are CSI Report Setting and CSI-RS resources). In terms of minimizing control signaling overhead, the total number of bits required for selecting one CSI Report Setting, one CSI-RS resource set, and one CSI-RS resource is $\lceil \log_2(N) \rceil + \lceil \log_2(K_s) \rceil$ bits, where N is the number of CSI Report Settings and $K_s$ is the number of CSI-RS resources within the $K_s$ CSI-RS Resource Set. Hence, the number bits for dynamic indication is reduced by $\lceil \log_2(S) \rceil$ bits.

Advantages of the second embodiment may include that the associated control signaling overhead is minimized. Due to the one-to-one correspondence between a Report Subset and a CSI-RS Resource Set, the selection of the Report Subset can be implicitly inferred from the dynamic indication of the CSI-RS Resource Set and the dynamic indication of CSI Report Setting. Since multiple Report Subsets are contained with a single CSI Report Setting, the number of bits required for dynamically indicating CSI Report Setting can be minimized.

Figure 9:
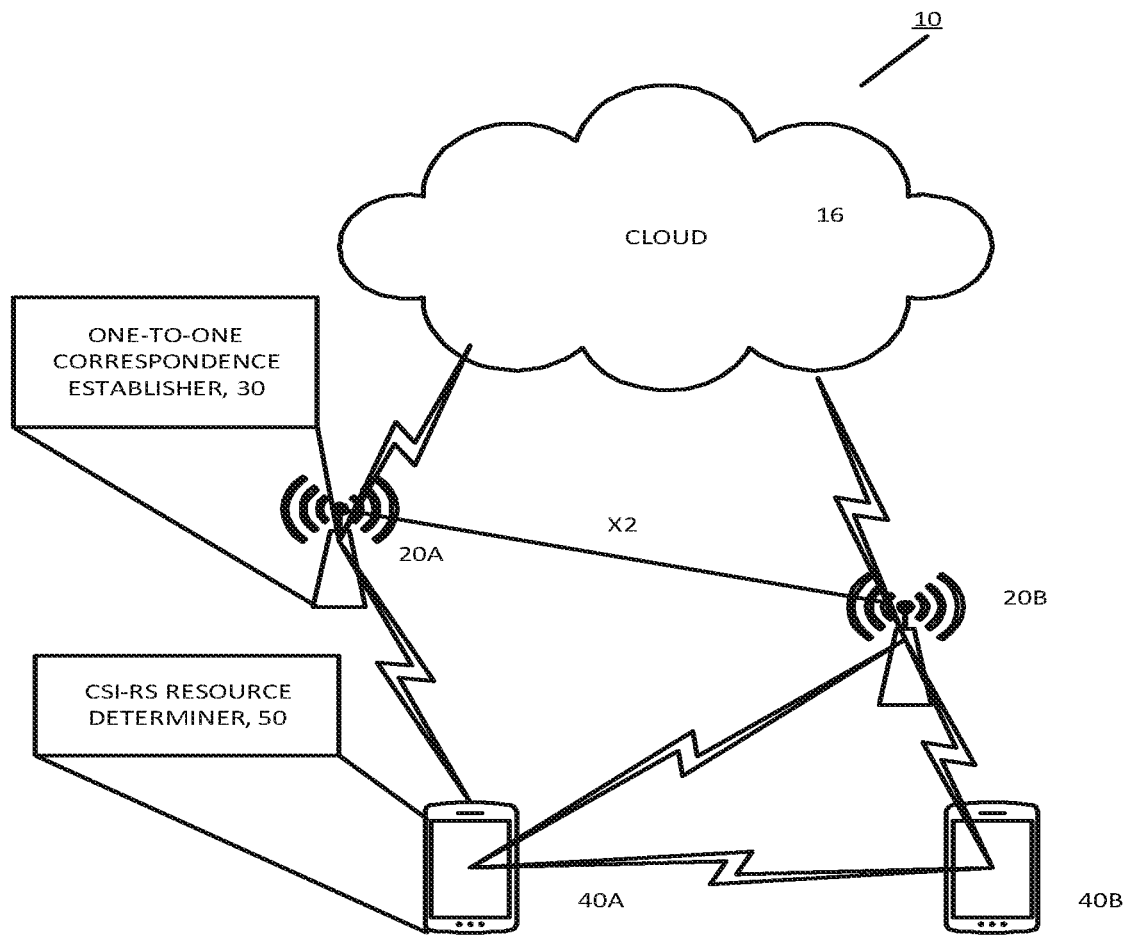
FIG. 9 is a block diagram of a wireless communication network configured in accordance with principles set forth herein.

FIG. 9 is a block diagram of a wireless communication network 10 constructed in accordance with principles set forth herein. The wireless communication network 10 includes a network cloud 16, which may include a public switched telephone network and/or the Internet, and may include a service provider backhaul network. A first base station 20A and a second base station 20B, referred to collectively herein as base stations 20, are in communication with the cloud 16 and may be in communication with each other. The base stations 20 may also be in communication with one or more wireless devices 40A and 40B, referred to collectively herein as WDs 40. The base stations 20 include a one-to-one correspondence establisher 30 that determines one of a one-to-one correspondence between a CSI report setting and a CSI-reference symbol (RS) resource set, and a one-to-one correspondence between a report subset and a CSI-RS resource set. Complementarily, the WDs 40 include a CSI-RS resource determiner 50 that determines one of a CSI-RS resource set based on an indication of a CSI report setting and a report subset based on a CSI report and a CSI-RS resource set.

Figure 10:
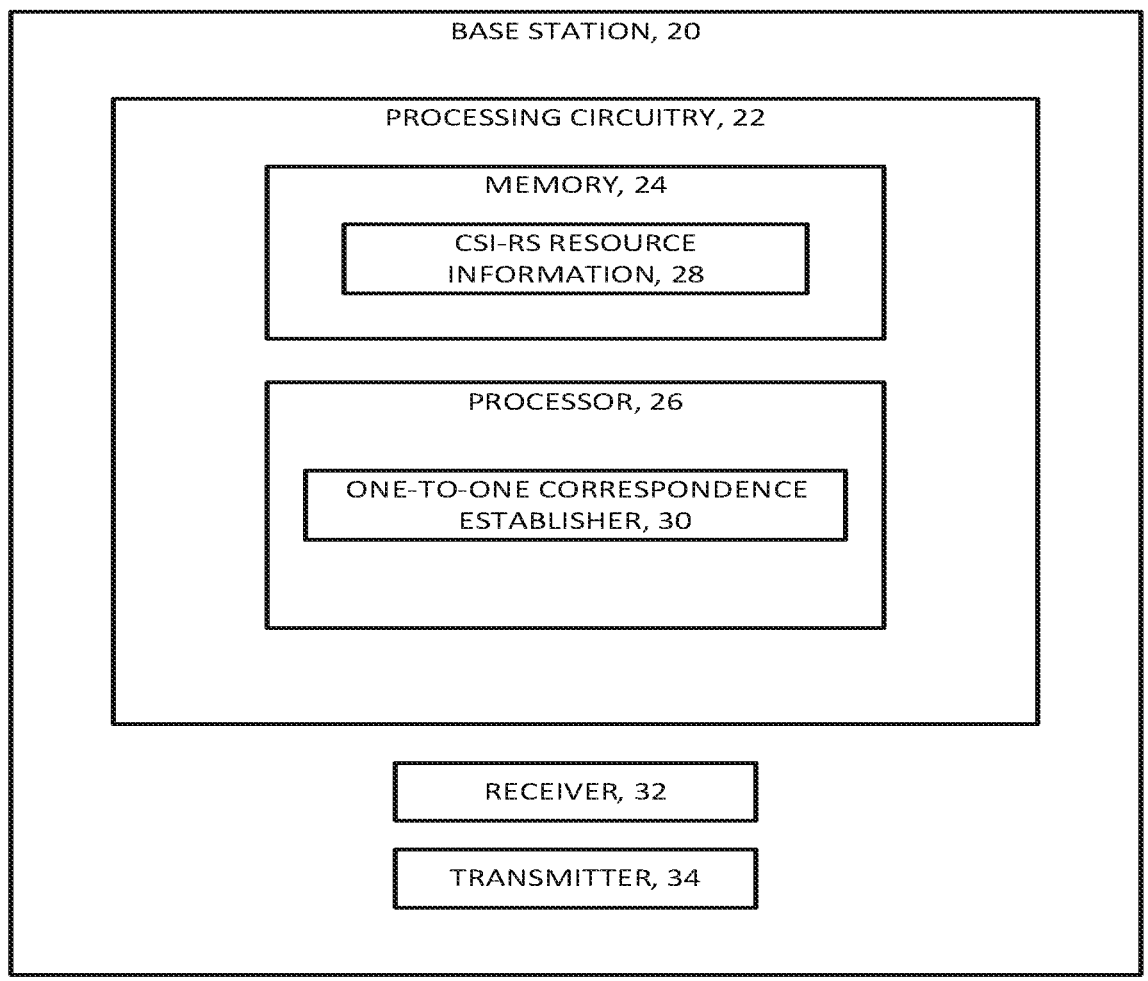
FIG. 10 is a block diagram of a base station configured in accordance with principles set forth herein.

FIG. 10 is a block diagram of a base station 20 configured in accordance with principles set forth herein. The base station 20 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store CSI-RS resource information 28 that may include correspondence information concerning correspondence between a CSI report setting and a CSI-reference symbol (RS) resource set and/or correspondence information concerning correspondence between a report subset and a CSI-RS resource set. The processor 26 is configured to implement a one-to-one correspondence establisher 30 that establishes one-to-one correspondence between a CSI report setting and a CSI-reference symbol (RS) resource set and/or between a report subset and a CSI-RS resource set. A receiver 32 may receive channel quality measurements from one or more wireless devices 40. A transmitter 34 is configured to send to the wireless device 40, an indication of the CSI report setting and the CSI-RS resources, in some embodiments.

Figure 11:
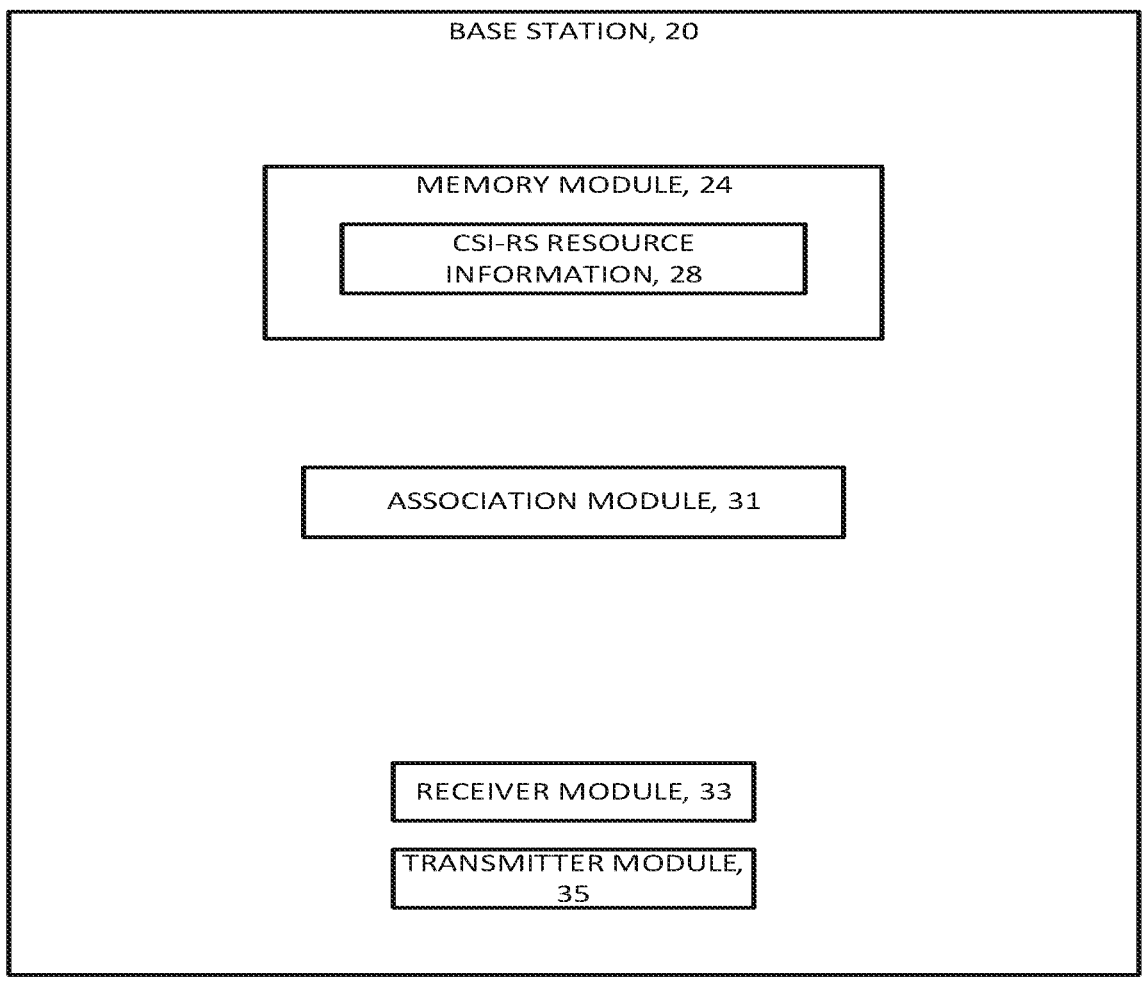
FIG. 11 is a block diagram of an alternative embodiment of the base station.

FIG. 11 is a block diagram of an alternative embodiment of the base station 20 having the memory 24 configured to store CSI-RS information 28 and having an association module 31 for establishing one of: a one-to-one correspondence between a CSI report setting and a CSI-reference symbol (RS) resource set and a one-to-one correspondence between a report subset and a CSI-RS resource set.

When a one-to-one correspondence between a CSI report setting and a CSI-reference symbol (RS) resource set is established, the CSI-RS resource set may be inferred at the wireless device 40 from an indication of the CSI report setting. Also, when a one-to-one correspondence between a report subset and a CSI-RS resource set is established, a report subset may be inferred at the wireless device 40 from an indication of the CSI-RS resource set and an indication of CSI report setting. The receiver module 33 is configured to receive channel quality measurements from the wireless devices 40. The transmitter module 35 is configured to send to the wireless device 40, an indication of the CSI report setting and the CSI-RS resources, in some embodiments.

Although embodiments are described herein with reference to certain functions being performed by base stations 20, it is understood that the functions can be performed in other network nodes and elements. It is also understood that the functions of the base stations 20 or other network nodes can be distributed across network cloud 16 so that other nodes can perform one or more functions or even parts of functions described herein.

Further, the term base station, e.g., a Radio Base Station (RBS), sometimes may be referred to herein as, e.g., evolved NodeB "eNB", "eNodeB", "NodeB", "B node", "gNB", "gNodeB", or BTS (Base Transceiver Station), depending on the technology and terminology used. The base stations 20 may be of different classes such as, e.g., macro eNodeB, home eNodeB or pico base station, based on transmission power and thereby also cell size. A cell is the geographical area where radio coverage is provided by the base station 20 at a base station site. One base station 20, situated on the base station site, may serve one or several cells. Further, each base station 20 may support one or several communication technologies. The base stations 20 communicate over the air interface operating on radio frequencies with the terminals within range of the base stations 20. In the context of this disclosure, the expression Downlink (DL) is used for the transmission path from the base station 20 to the WD 40. The expression Uplink (UL) is used for the transmission path in the opposite direction i.e. from the WD 40 to the base station 20.

In 3rd Generation Partnership Project (3GPP) Long Term Evolution (LTE), base stations, which may be referred to as eNodeBs or eNBs, or in 5G and NR, base stations, which may be referred to as gNodeBs or gNBs, may be directly connected to one or more core networks. Further, although embodiments are described with reference to base stations, it is understood that embodiments can be implemented in or across any suitable network node, of which the base stations 20 are a type. Also, it is also understood that the functions of the base station 20 or other network nodes can be distributed across the network cloud 16 so that other nodes can perform one or more functions, or even parts of functions, described herein.

Figure 12:
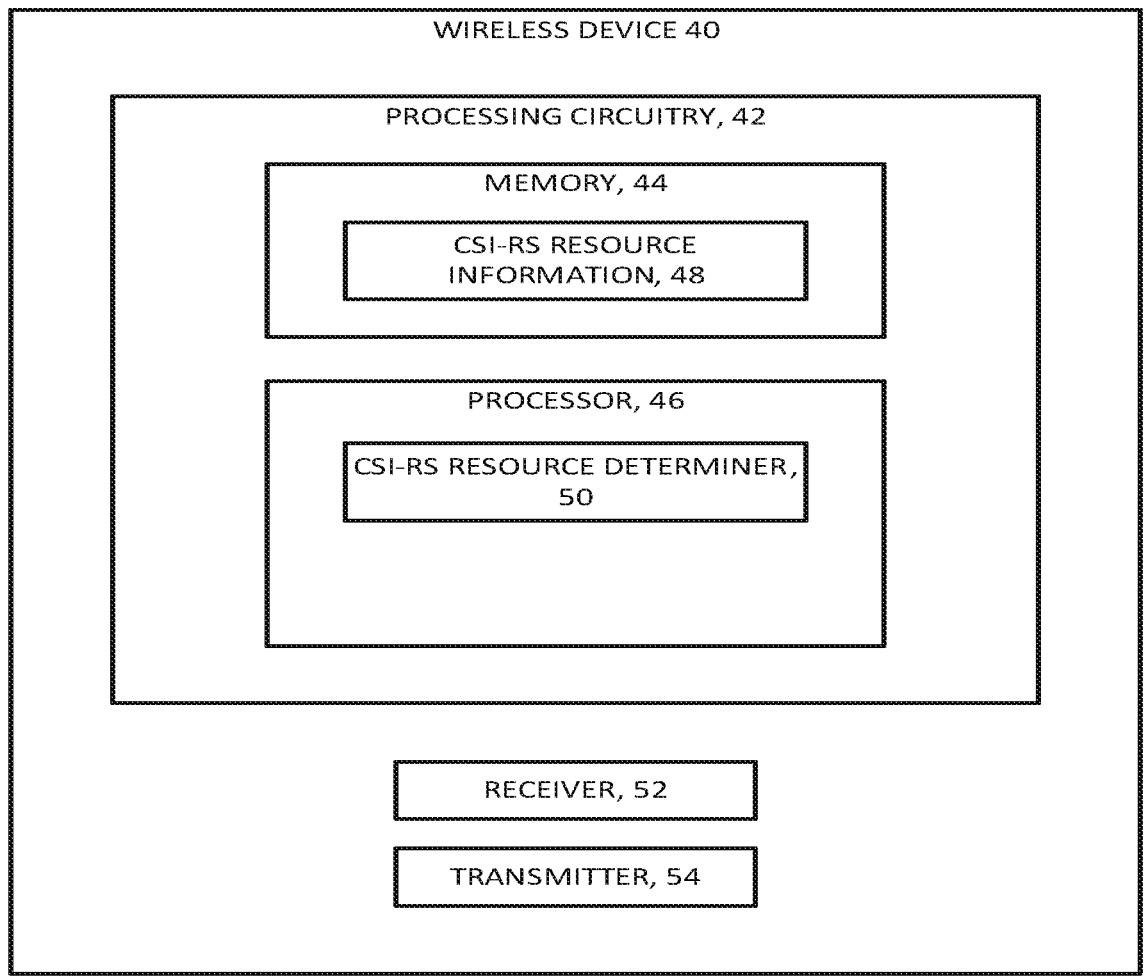
FIG. 12 is a block diagram of a wireless device configured in accordance with principles set forth herein.

FIG. 12 is a block diagram of WD 40. The WD 40 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store CSI-RS resource information 48 that may include an indication of a CSI report setting, a CSI report and a CSI-RS resource set. The processor 46 is configured to implement a CRS-RD resource determiner 50 to determine one of a CSI-RS resource set based on an indication of a CSI report setting and a report subset based on a CSI report and a CSI-RS resource set. In some embodiments, the CSI report setting has a one-to-one correspondence to a CSI-RS resource set and the CSI-RS resource set has a one-to-one correspondence to a report set. The receiver 52 is configured to receive from the base station, an indication of the CSI report setting and the CSI-RS resources, in some embodiments. The transmitter 54 is configured to transmit channel quality measurements to the base station 20.

Figure 13:
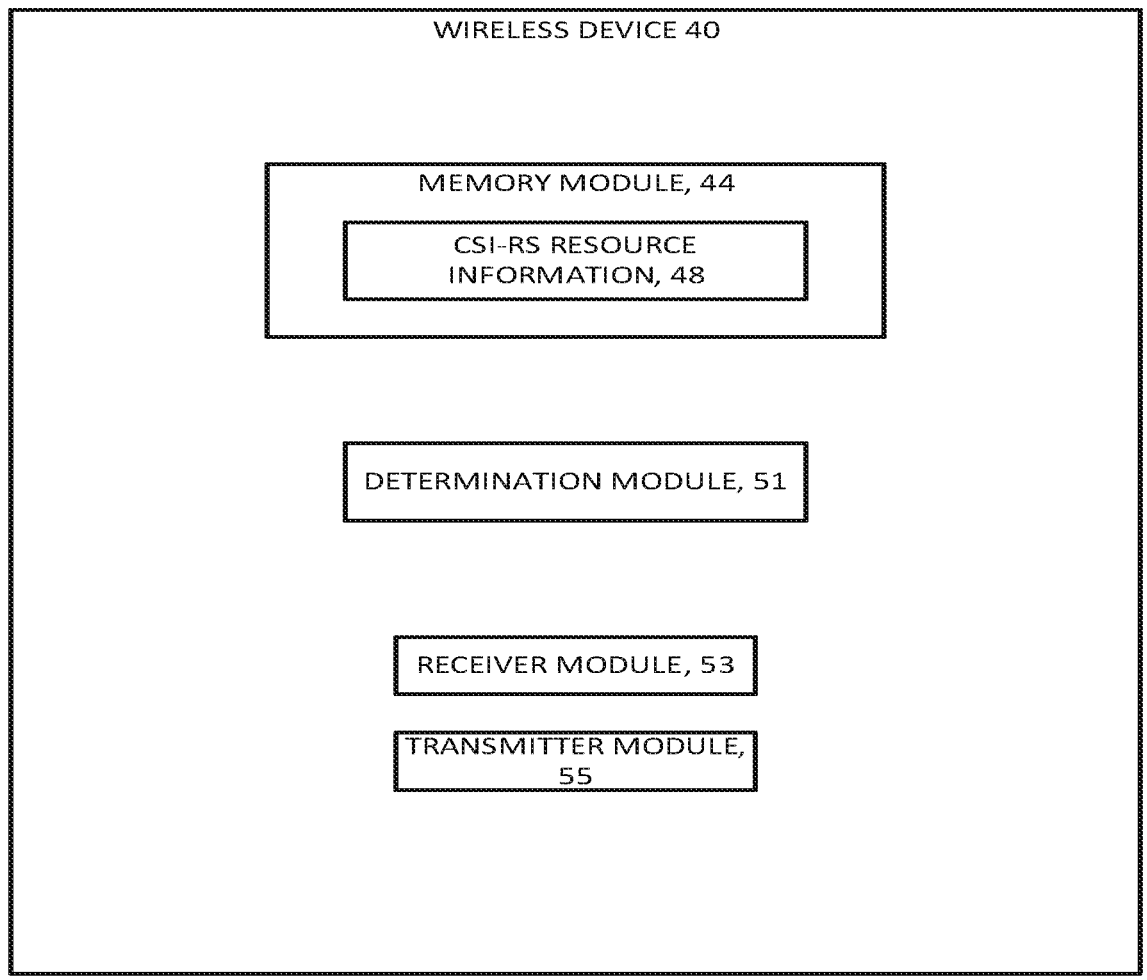
FIG. 13 is a block diagram of an alternative embodiment of the wireless device.

FIG. 13 is a block diagram of an alternative embodiment of the wireless device 40 having the memory 44, a determination module 51, a receiver module 53 and a transmitter module 55. The memory module 44 stores CSI-RS resource information 48. The determination module 51 is configured to determine one of a CSI-RS resource set based on an indication of a CSI report setting and a report subset based on a CSI report and a CSI-RS resource set. The receiver module 53 is configured to receive from the base station, an indication of the CSI report setting and the CSI-RS resources, in some embodiments. The transmitter module 55 is configured to transmit channel quality measurements to the base station 20.

In some embodiments, a non-limiting term "wireless device" is used. The wireless device 40 herein can be any type of wireless device capable of communicating with a network entity such as a base station 20 or another wireless device 40 such as user equipment (UE) over radio signals. The wireless device 40 may also be a radio communication device, target device, device to device (D2D) wireless device, machine type wireless device or wireless device capable of machine to machine communication (M2M), a sensor equipped with wireless device, iPAD, Tablet, mobile terminals, smart phone, laptop embedded equipped (LEE), laptop mounted equipment (LME), USB dongles, Customer Premises Equipment (CPE), etc.

Figure 14:
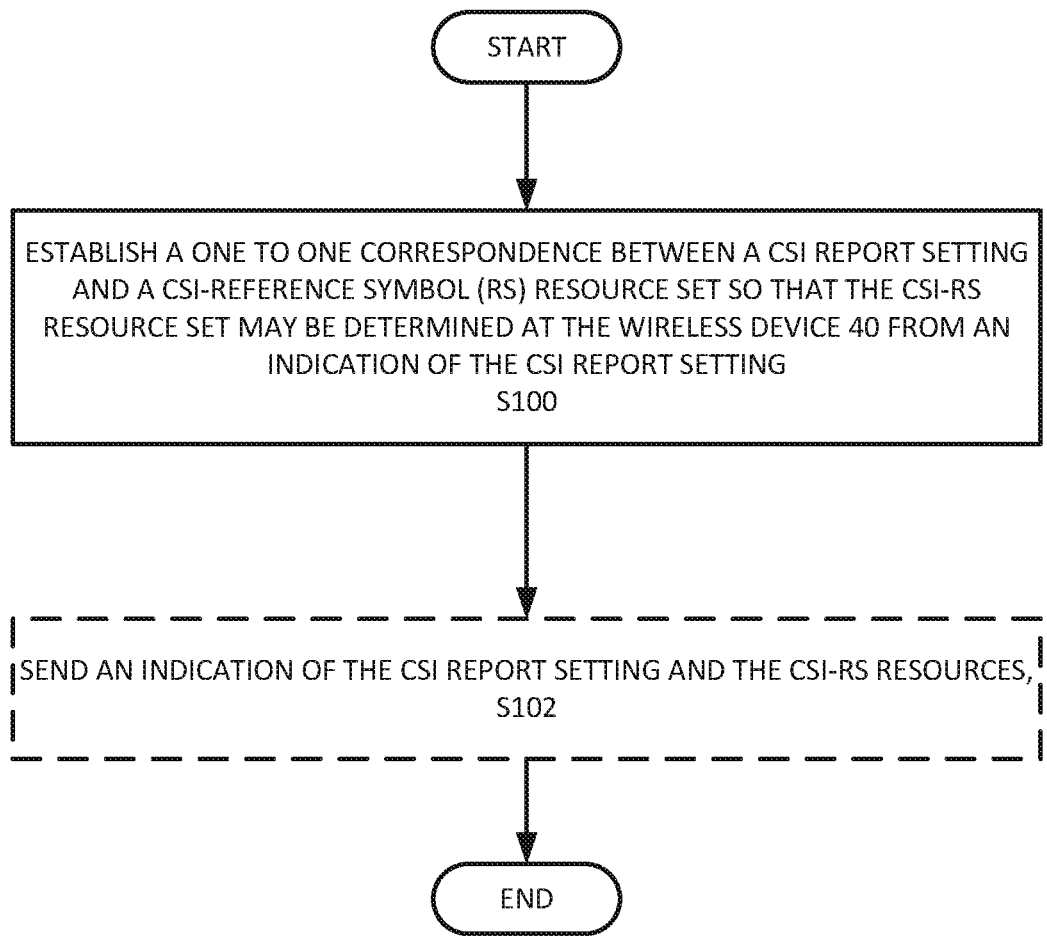
FIG. 14 is a flowchart of an exemplary process in a base station for dynamic indication of CSI resources to a wireless device.

FIG. 14 is a flowchart of an exemplary process for use in a base station 20 using control signaling for dynamic indication of channel state information (CSI) resources to a wireless device 40. In a first case, a one-to-one correspondence between a CSI report setting and a CSI-RS resource set is established so that the CSI-RS resource set may be determined at the wireless device 40 from an indication of the CSI report setting (block S100). In some embodiments, an indication of the CSI report setting and the CSI-RS resources is sent to the wireless device 40 via the transmitter 34 (block S102)

Figure 15:
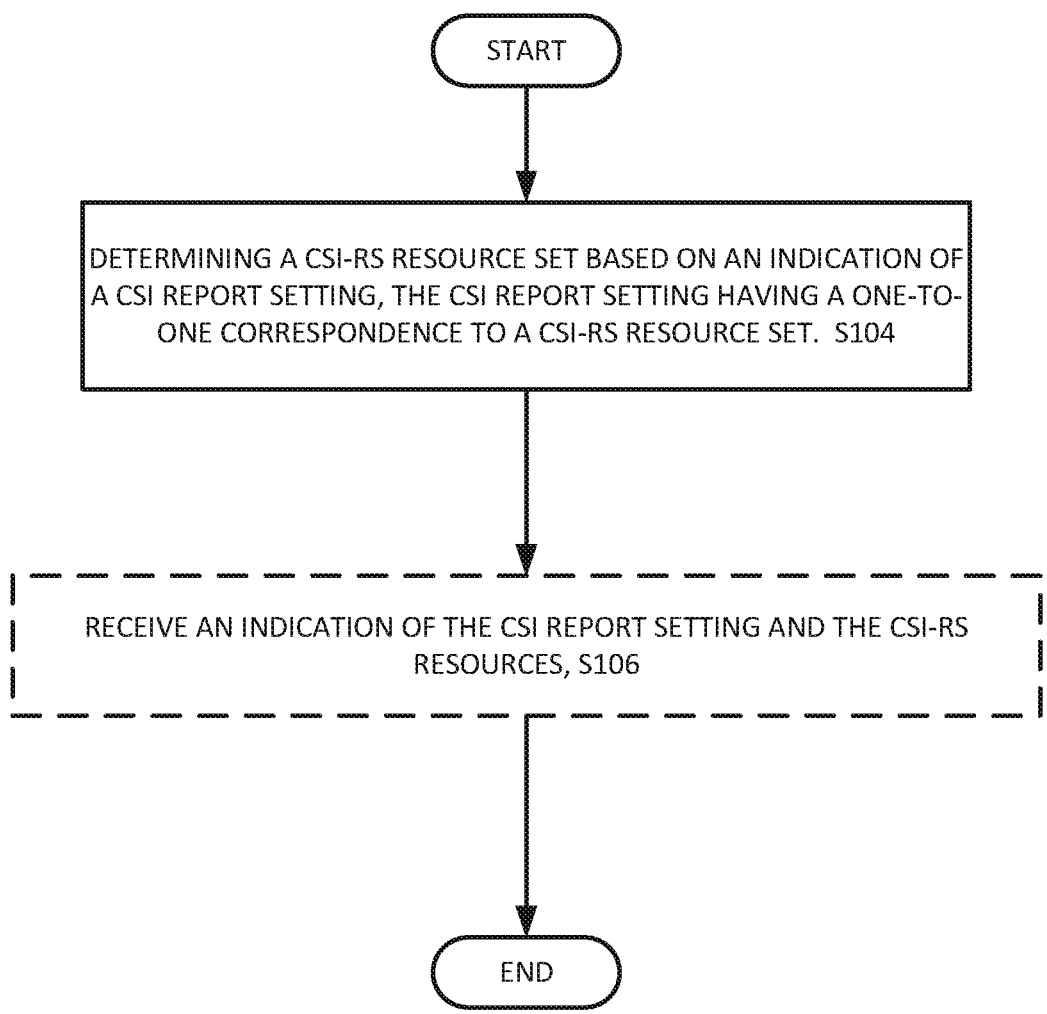
FIG. 15 is a flowchart of an exemplary process in a wireless device for determining a CSI-RS, resource set indicated by a base station.

FIG. 15 is a flowchart of an exemplary process in a wireless device 40 for determining a CSI-RS resource set indicated by a base station. The process includes determining, via determiner 50, a CSI-RS resource set is determined based on an indication of a CSI report setting, the CSI report setting having a one to one correspondence to a CSI-RS resource set (block S104). In some embodiments, an indication of the CSI report setting and the CSI-RS resources are received via the receiver 52 (block S110).

Figure 16:
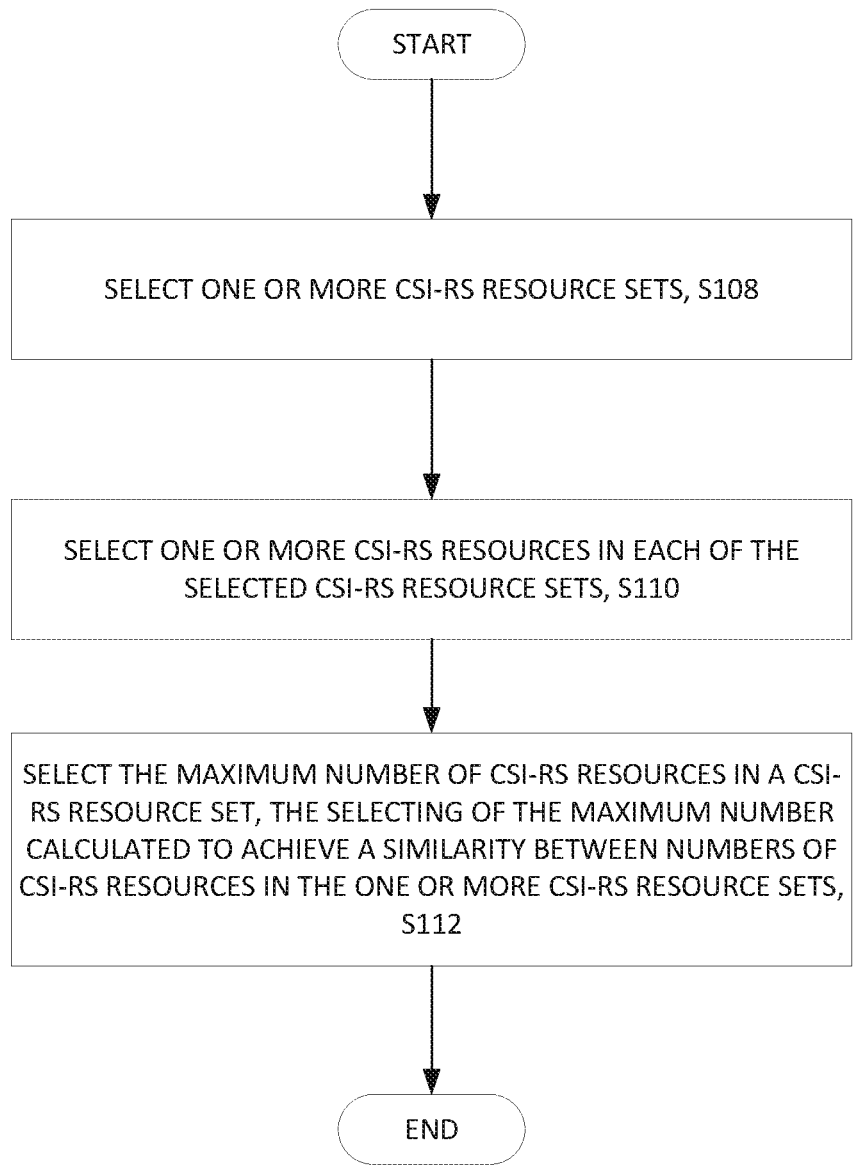
FIG. 16 is a flowchart of an exemplary process for signaling CSI-RS resources from a based station to be received and used by a wireless device.

FIG. 16 is a flowchart of an exemplary process for signaling CRS-RS resources to be used by a wireless device 40. The process includes selecting, via the processing circuitry 22, one or more CSI-RS resource sets (block S108). The process also includes selecting, via the processing circuitry 22, one or more CSI-RS resources in each of the selected CSI-RS resource sets (block S110). The process also includes selecting, via the processing circuitry 22, the maximum number of CSI-RS resources in a CSI-RS resource set, the selecting of the maximum number calculated to achieve a similarity between numbers of CSI-RS resources in the one or more CSI-RS resource sets (block S112).

Figure 17:
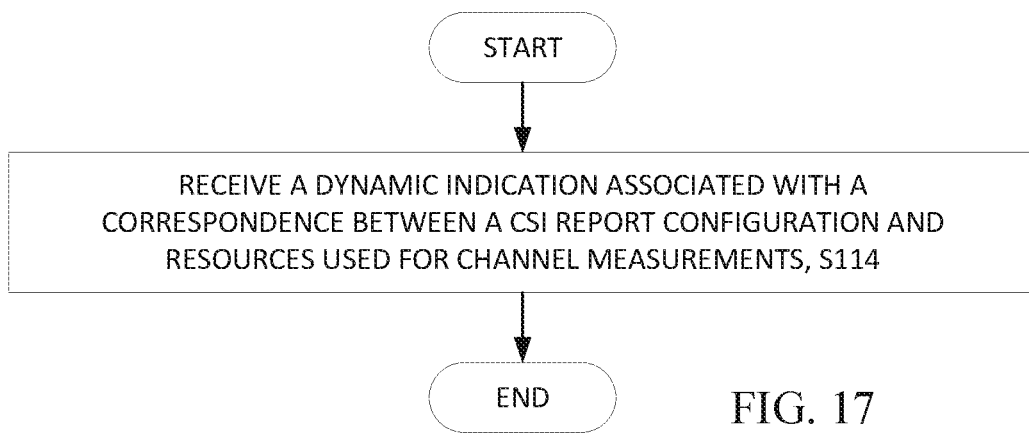
FIG. 17 is a flowchart of an exemplary process for initiating CSI feedback in a wireless device.

FIG. 17 is a flowchart of an exemplary process for initiating CSI feedback in a wireless device 40 configured by higher layers with a CSI Report containing parameters related to CSI reporting is provided. The process includes receiving a dynamic indication associated with a correspondence between the CSI Report (or CSI Report configuration) and the resources used for channel measurement (block S114).

Figure 18:
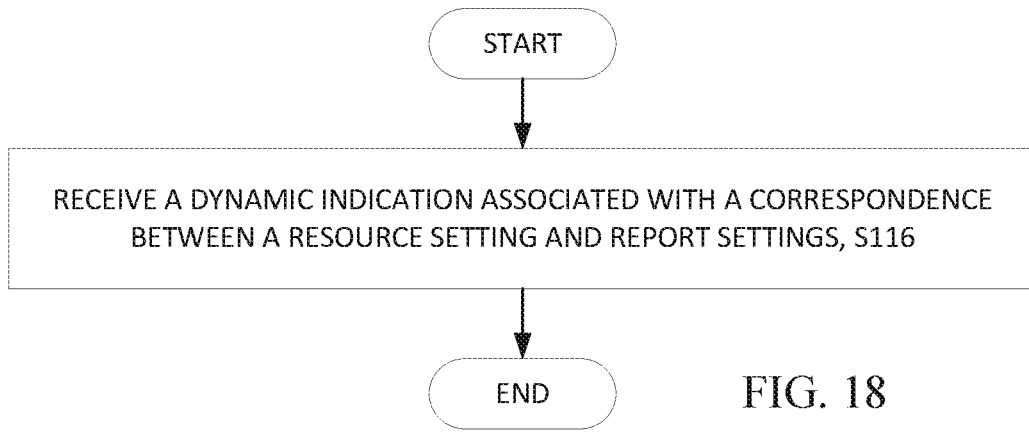
FIG. 18 is a flowchart of an alternative exemplary process for initiating CSI feedback in a wireless device.

FIG. 18 is a flowchart of an exemplary process for initiating channel state information, CSI, feedback in a wireless device 40 configured by higher layers with at least one of M Report Settings containing parameters related to CSI reporting and N Resource Settings containing parameters defining the resources used for channel measurement and their properties is provided. The process includes receiving a dynamic indication associated with a correspondence between the Resource Setting and the Report Settings (block S116).

Figure 19:
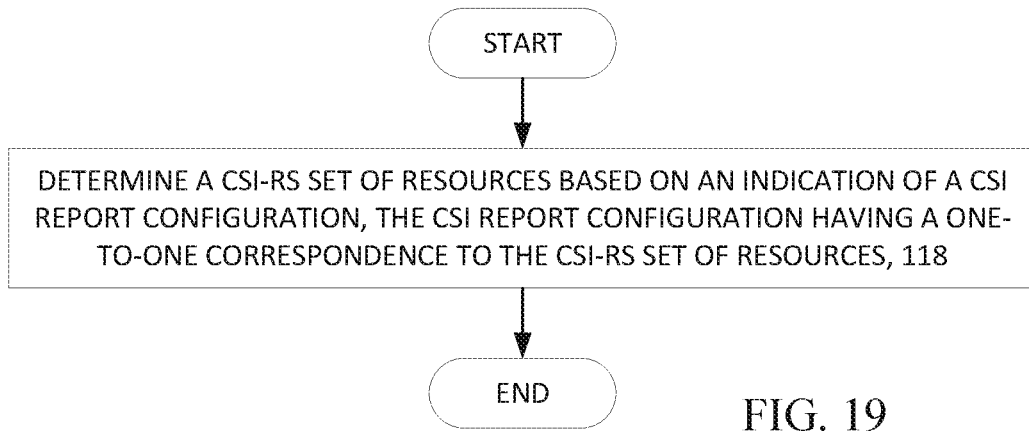
FIG. 19 is a flowchart of an exemplary process in a wireless device for determining a channel state information reference symbol, CSI-RS, set of resources indicated by a base station.

FIG. 19 is flowchart of an exemplary process in a wireless device 40 for determining a channel state information reference symbol, CSI-RS, set of resources indicated by a base station 20 is provided. The process includes determining a CSI-RS set of resources based on an indication of a CSI report (or CSI Report configuration), the CSI report (or CSI Report configuration) having a one-to-one correspondence to the CSI-RS set of resources (block S118). According to this aspect, in some embodiments, the CSI-RS resource set includes resources used for channel measurement.

In some embodiments, the correspondences referred herein are RRC configured. Furthermore, in some embodiments, by dynamically triggering a CSI report, the CSI resources are automatically triggered, given the configured correspondence(s).

Embodiment A

Figure 20:
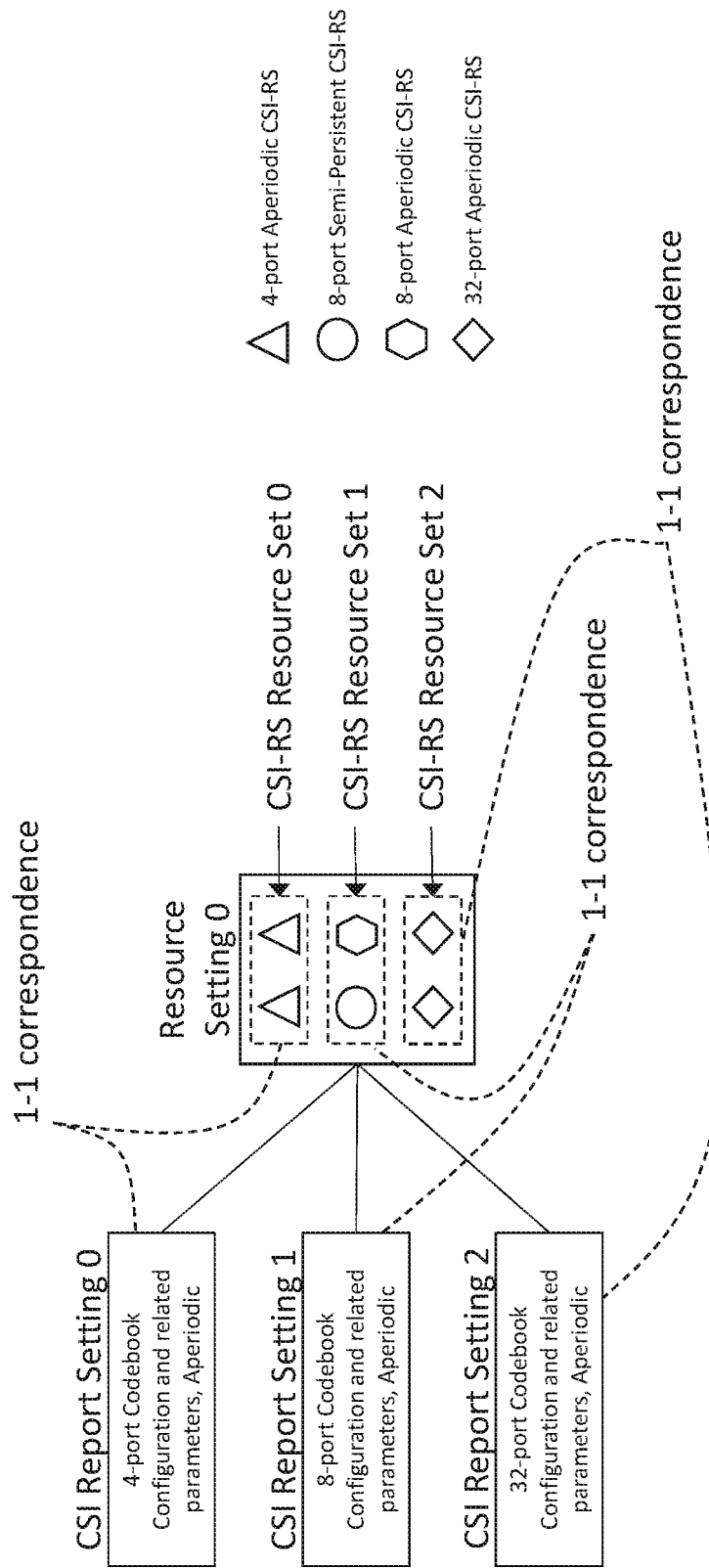
FIG. 20 is a graphical illustration of exemplary CSI-RS relationships.

In Embodiment A, each Resource Setting in a WD is configured such that the CSI-RS Resource sets within the Resource Setting contain CSI-RS resources with the same configuration parameters (e.g., the same number of ports and the same time-domain behavior, i.e., periodic, semi-persistent, aperiodic CSI-RS resources). FIG. 20 shows an example of this embodiment where Resource Setting 0 contains S=3 different CSI-RS Resource Sets. Each of the three CSI-RS resource sets have CSI-RS resources with the same configuration parameters. For instance, CSI-RS Resource Set 0 contains 2 CSI-RS resources both having 4 ports and aperiodic time-domain behavior, CSI-RS Resource Set 1 contains 2 CSI-RS resources both having 8 ports and semi-persistent time-domain behavior, etc.

Furthermore, in Embodiment A, a Resource Setting containing S different CSI-RS Resource Sets is linked to S CSI Report Settings where the $s^{th}$ CSI Report Setting corresponds to the $s^{th}$ CSI-RS Resource Set within the Resource Setting. The CSI Report Setting—CSI-RS Resource Set pair that correspond to each other have compatible parameter configurations. In the example of FIG. 20, CSI-RS Report Setting 2 with a 32-port codebook configuration corresponds to CSI-RS Resource Set 2 which contains 32-port CSI-RS resources. Furthermore, CSI-RS Report Setting 2 is aperiodic and CSI-RS Resource Set 2 also contains aperiodic CSI-RS resources. Hence, CSI-RS Report Setting 2 is compatible with CSI-RS Resource Set 2 in terms of both the number of ports and time-domain behavior. Even though this example illustrates compatibility in terms of the number of ports and time-domain behavior, the notion of compatibility between a CSI-RS Report Setting and CSI-RS Resource Set in Embodiment A can be easily extended in terms of other parameters as well.

Advantages of Embodiment A may include that the dynamic indication is simplified and associated control signaling overhead is minimized. Due to the one-to-one correspondence between a CSI Report Setting and a CSI-RS Resource Set, the selection of the CSI-RS Resource Set can be implicitly inferred from the dynamic indication of the CSI Report Setting. Hence, only two different entities need to be dynamically indicated (the two entities are CSI Report Setting and CSI-RS resources). In terms of minimizing control signaling overhead, the total number of bits required for selecting on CSI Report Setting, one CSI-RS resource set, and one CSI-RS resource is $\lceil \log_2(N) \rceil + \lceil \log_2(K_s) \rceil$ bits, where N is the number of CSI Report Settings and $K_s$ is the number of CSI-RS resources within the $K_s$ CSI-RS Resource Set. Hence, the number bits for dynamic indication is reduced by $\lceil \log_2(S) \rceil$ bits.

In some embodiments DCI signaling is used for dynamic indication. In some other embodiments, MAC CE is used for dynamic signaling.

Figure 21:
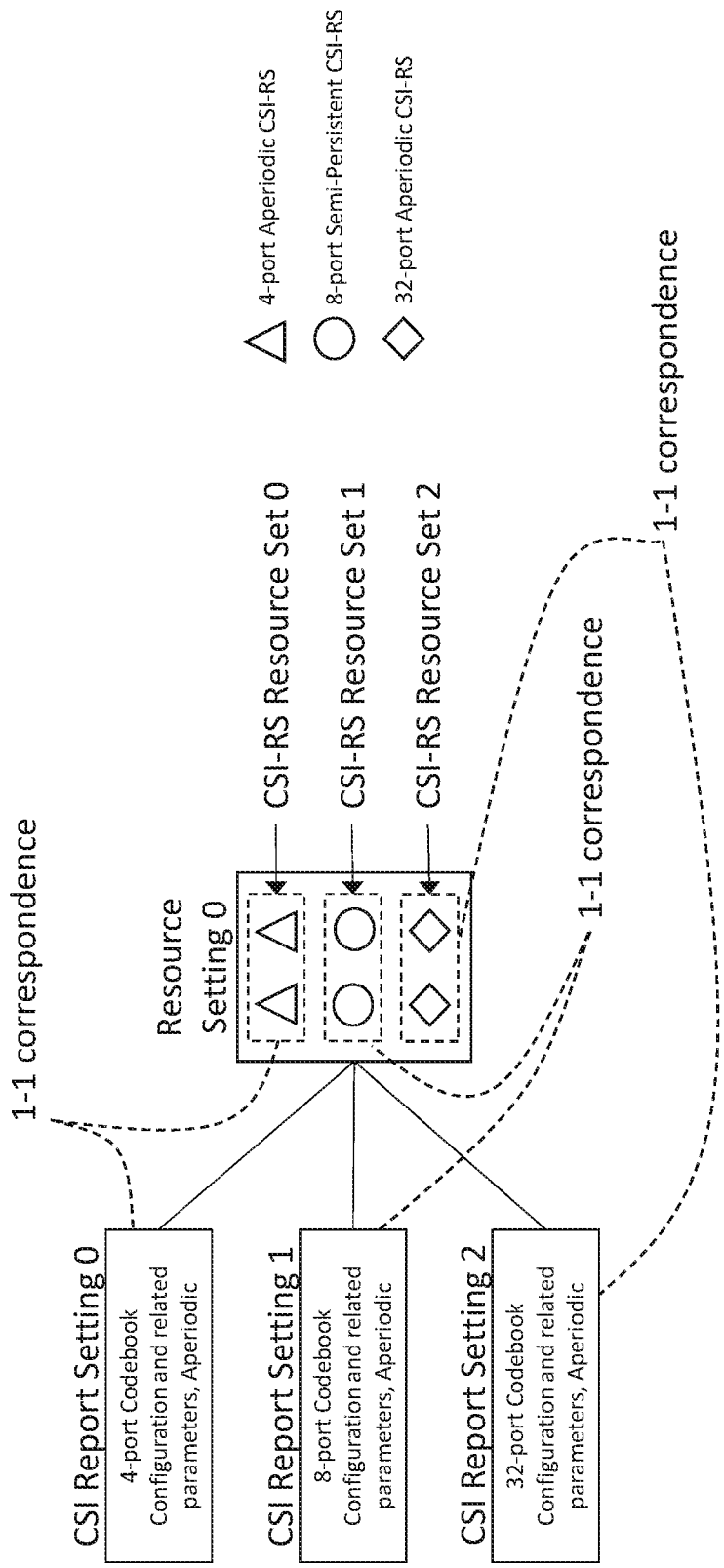
FIG. 21 is a graphical illustration of second exemplary CSI-RS relationships.

Optionally, in a variant of Embodiment A, CSI-RS resources within the same CSI-RS Resource Set may have the same configuration for only a subset of the parameters. In the example of FIG. 21, CSI Report Setting 1 with an 8-port codebook configuration corresponds to CSI-RS Resource Set 1 which contains 8-port CSI-RS resources. However, the time-domain behavior of the two resources within CSI-RS Resource Set 1 is different (i.e., one CSI-RS resource is aperiodic while the other one is semi-persistent). Albeit the two CSI-RS resources within CSI-RS Resource Set 1 have different time-domain behavior, they are both compatible with the time-domain behavior of CSI Report Setting 1 (recall from Table 2 that both Aperiodic CSI-RS and Semi-Persistent CSI-RS are compatible with Aperiodic CSI Reporting). In this case, which type of CSI-RS resource to use (i.e., Aperiodic or Semi-Persistent) can be determined by dynamic indication.

Embodiment B

Figure 22:
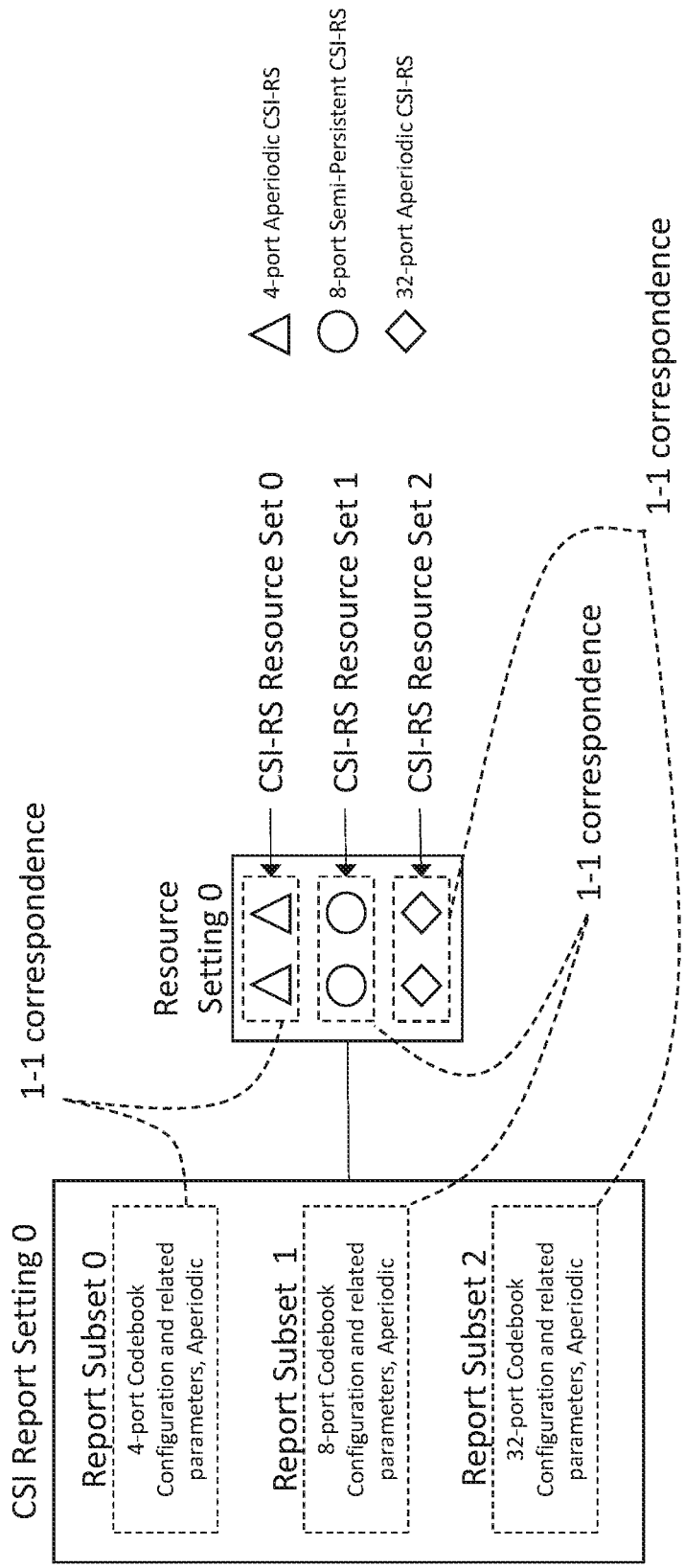
FIG. 22 is a graphical illustration of third exemplary CSI-RS relationships.

In Embodiment B, a Resource Setting containing S different CSI-RS Resource Sets is linked to one CSI Report Setting. The CSI Report Setting linked to the Resource Setting contains S different Report subsets. The $s^{th}$ Report Subset within the CSI Report Setting corresponds to the $s^{th}$ CSI-RS Resource Set within the Resource Setting. In the example of FIG. 22, Report Subset 2 with a 32-port codebook configuration corresponds to CSI-RS Resource Set 2 which contains 32-port CSI-RS resources. Furthermore, Report Subset 2 is aperiodic and CSI-RS Resource Set 2 also contains aperiodic CSI-RS resources. Hence, Report Subset 2 is compatible with CSI-RS Resource Set 2 in terms of the number of ports and time-domain behavior. Even though this example illustrates compatibility in terms of the number of ports and time-domain behavior, the notion of compatibility between a Report Subset and CSI-RS Resource Set in Embodiment B can be easily extended in terms of other parameters as well.

An advantage of Embodiment B may be that this embodiment minimizes the associated control signaling overhead. Due to the one-to-one correspondence between a Report Subset and a CSI-RS Resource Set, the selection of the Report Subset can be implicitly inferred from the dynamic indication of the CSI-RS Resource Set and the dynamic indication of CSI Report Setting. Since multiple Report Subsets are contained with a single CSI Report Setting, the number of bits required for dynamically indicating CSI Report Setting can be minimized compared to a case where four entities (CSI Report Setting, Report Subsets, CSI-RS Resource Set, and CSI-RS Resources) are all dynamically indicated explicitly.

In some embodiments, DCI signaling is used for dynamic indication. In some other embodiments, MAC CE is used for dynamic signaling.

Embodiment C

Note that multiple CSI-RS resource sets can be configured to a wireless device 40 and for each CSI-RS resource set, there can be multiple CSI-RS resources. In Embodiment C, one or more CSI-RS resource(s) is/are selected by first selecting a CSI-RS resource set and then selecting one or more CSI-RS resources in the selected set. Since the number of bits required for resource selection needs to be designed according to the number of CSI-RS resource sets and the maximum number of CSI-RS resources in a set, for efficient dynamic signaling/indication, the number of CSI-RS resources in each of the CSI-RS resource sets should be as similar as possible. For example, if there are four CSI-RS resource sets, the first set has 16 CSI-RS resources while the other three CSI-RS resource sets have 4 resources each (i.e. total 28 resources), then a total of 6 bits are required to select a CSI-RS resource, i.e. 2 bits for CSI-RS resource set selection and 4 bits for CSI-RS resource selection in the selected set. On the other hand, if the 28 CSI-RS resources are in two CSI-RS resource sets each having 14 CSI-RS resources, then only 5 bits would be needed.

In another embodiment, each CSI-RS resource set may contain CSI-RS resources with different number of antenna ports, and with different time domain behavior, i.e. they can be periodic or aperiodic CSI-RS resources. Multiple CSI report settings can be dynamically associated with one CSI-RS resource set and one or more CSI-RS resources within the selected CSI-RS resource set. An example is shown in TABLE 3, where three CSI-RS resource sets are configured to a wireless device 40. In the first set, the UE is configured with six CSI-RS resources with 8 ports and one CSI-RS resource with 32 ports, and the CSI-RS resources have different time domain behavior. This can be used to support hybrid CSI reporting where periodic CSI is reported using CSI-RS resource #5 with 32 ports. Aperiodic CSI reporting can also be done for 32 ports with resource #5. Aperiodic CSI reporting for 8 ports can use either one of the four 8-ports CSI-RS resources, i.e. resources #0 to 3 within CSI-RS resource set 0, dynamically selected, or use the 8 port semi-persistent CSI-RS resource #4. CSI-RS resource sets #1 and #2 may be used to perform CSI reporting from other TRPs in a CoMP transmission scheme.

In some cases, CSI-RS resources in a whole CSI-RS resource set can be selected for reporting the best CSI out of all the CSIs measured over all the CSI-RS resource or the best Ω reference signal received powers (RSRPs). Here, each RSRP corresponds to one of the CSI-RS resources within the selected CSI-RS resource set.

The number of CSI-RS resource sets as well as the maximum number of CSI-RS resource in each CSI-RS resource set may be semi-statically configured so that the number of bits used in dynamic indication for CSI-RS resource selection can be minimized according to each deployment scenario.

TABLE 3

|  | CSI-RS resource index | | | | | |
| --- | --- | --- | --- | --- | --- | --- |
|  | 0 | 1 | 2 | 3 | 4 | 5 |
| CSI-RS resource set 0 | 8 ports aperiodic | 8 ports aperiodic | 8 ports aperiodic | 8 ports aperiodic | 8 ports semi-persistent | 32 ports periodic |
| CSI-RS resource set 1 | 2 ports aperiodic | 2 ports aperiodic | 2 ports aperiodic | 2 ports aperiodic | 2 ports semi-persistent | 8 ports periodic |
| CSI-RS resource set 3 | 4 ports aperiodic | 4 ports aperiodic | 4 ports aperiodic | 4 ports aperiodic | 4 ports semi-persistent | 16 ports periodic |

Figure 23:
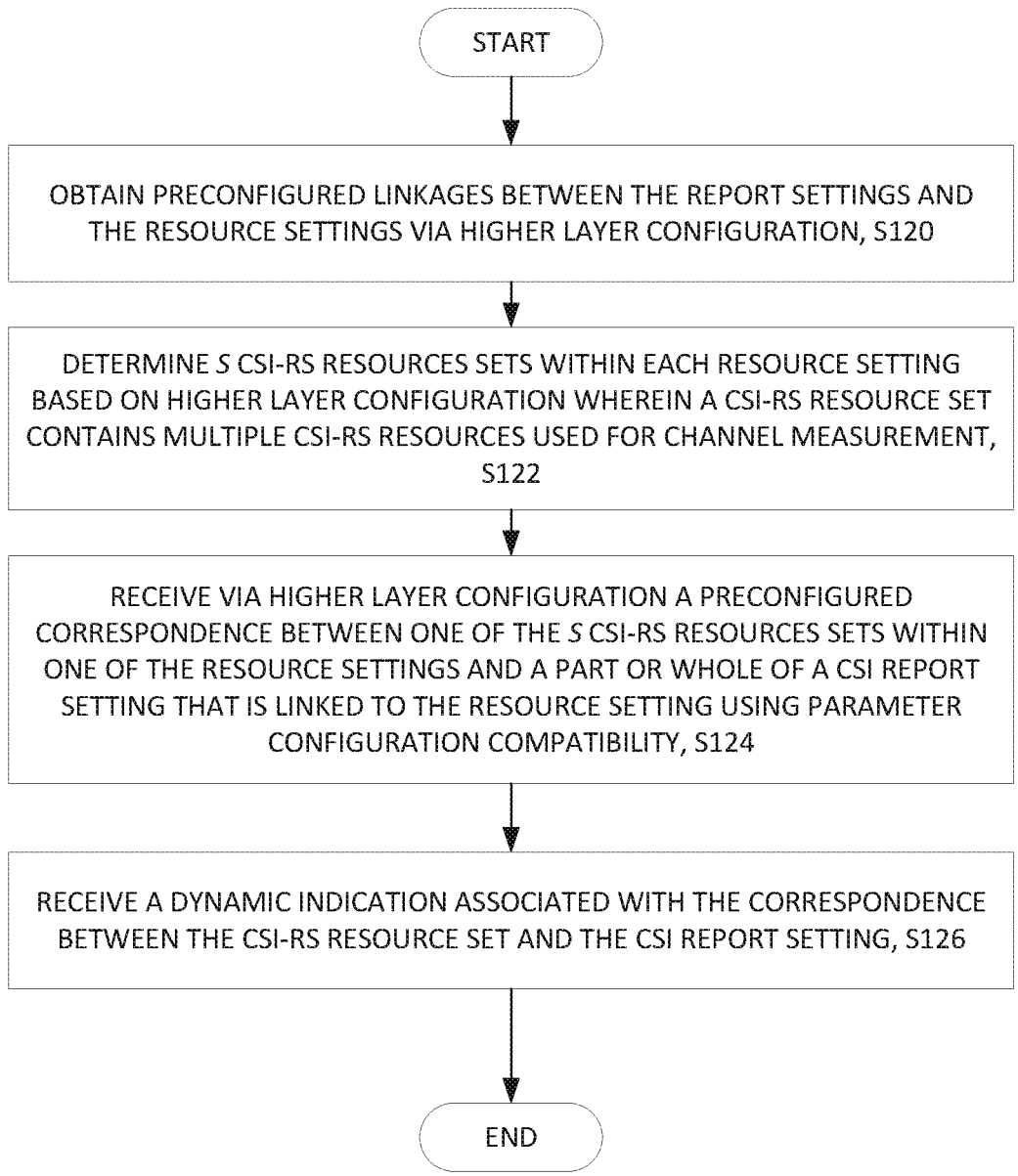
FIG. 23 is a flowchart of an alternative exemplary process for initiating CSI feedback in a wireless device.

FIG. 23 is a flowchart of an alternative exemplary process for initiating CSI feedback in a wireless device configured by higher layers with M Report Settings containing parameters related to CSI reporting and N Resource Settings containing parameters defining the resources used for channel measurement and their properties. The process includes performing at least one of the following steps: obtaining preconfigured linkages between the Report Settings and the Resource Settings via higher layer configuration (S120); determining S CSI-RS Resources Sets within each Resource Setting based on higher layer configuration wherein a CSI-RS Resource Set contains multiple CSI-RS resources used for channel measurement (S122); receiving via higher layer configuration a Preconfigured correspondence between one of the S CSI-RS Resources Sets within one of the Resource Settings and a part or whole of a CSI Report Setting that is linked to the Resource Setting using parameter configuration compatibility (S124); and receiving a dynamic indication associated with the correspondence between the CSI-RS Resource Set and the CSI Report Setting (S126).

Thus, some embodiments include a method of initiating channel state information, CSI, feedback in a wireless device configured by higher layers with M Report Settings containing parameters related to CSI reporting and N Resource Settings containing parameters defining the resources used for channel measurement and their properties. The method includes a) Obtaining Preconfigured linkages between the Report Settings and the Resource Settings via higher layer configuration (S120); b) Determining S CSI-RS Resources Sets within each Resource Setting based on higher layer configuration wherein a CSI-RS Resource Set contains multiple CSI-RS resources used for channel measurement (S122); c) Receiving via higher layer configuration a Preconfigured correspondence between one of the S CSI-RS Resources Sets within one of the Resource Settings and a part or whole of a CSI Report Setting that is linked to the Resource Setting using parameter configuration compatibility (S124); and d) Receiving a dynamic indication associated with the correspondence between the CSI-RS Resource Set and the CSI Report Setting (S126).

According to this aspect, in some embodiments, a codebook configuration and one or more related parameters defined in the Report Setting are compatible with a number of ports in the CSI-RS resources contained within a CSI-RS Resource Set. In some embodiments, a time-domain behavior defined in the Report Setting is compatible with a time-domain behavior in the CSI-RS resources contained within the CSI-RS Resource Set. In some embodiments, the dynamic indication is given by DCI. In some embodiments, the dynamic indication is given by MAC CE. In some embodiments, the number of Report Settings M linked to one Resource Setting (N=1) is set equal to the number of CSI-RS Resource Sets S within the one Resource Setting. In some embodiments, a whole of a Report Setting corresponds to only one CSI-RS Resource Set. In some embodiments, entities dynamically indicated explicitly include a selection of one or more CSI Report Setting(s) and a selection of one or more CSI-RS resources. In some embodiments, the indication of CSI-RS Resource Set is implicitly given by the dynamic indication of the selection of CSI Report Setting(s). In some embodiments, one Report Setting (M=1) is linked to one Resource Setting (N=1) which contains S CSI-RS Resource Sets.

According to another aspect, a method for a wireless device 40 for determining a channel state information reference symbol, CSI-RS, resource set indicated by a base station 20 is provided. The method includes determining a CSI-RS resource set based on an indication of a CSI report setting (S118), the CSI report setting having a one-to-one correspondence to a CSI-RS resource set.

According to this aspect, in some embodiments, the method further includes receiving from the base station, an indication of the CSI report setting and the CSI-RS resources within the CSI-RS resource set. In some embodiments, a resource set is unique to at least one of a number of antenna ports and a particular time-domain behavior of the resources in the CSI-RS resource set. In some embodiments, an integer number of different CSI-RS resource sets is linked to one CSI report setting. In some embodiments, the CSI-RS resource set includes resources used for channel measurements.

According to another aspect, a wireless device 40 initiating channel state information, CSI, feedback in a wireless device configured by higher layers with M Report Settings containing parameters related to CSI reporting and N Resource Settings containing parameters defining the resources used for channel measurement and their properties, the wireless device 40 comprising processing circuitry 42 configured to perform at least one of: a) Obtaining Preconfigured linkages between the Report Settings and the Resource Settings via higher layer configuration; b) Determining S CSI-RS Resources Sets within each Resource Setting based on higher layer configuration wherein a CSI-RS Resource Set contains multiple CSI-RS resources used for channel measurement; c) Receiving via higher layer configuration a Preconfigured correspondence between a CSI-RS Resource Set within a Resource Setting and a part or whole of a CSI Report Setting that is linked to the Resource Setting using parameter configuration compatibility; and d) Receiving a dynamic indication associated with the correspondence between the CSI-RS Resource Set and the CSI Report Setting.

According to this aspect, a codebook configuration and one or more related parameters defined in the Report Setting are compatible with a number of ports in the CSI-RS resources contained within a CSI-RS Resource Set. In some embodiments, a time-domain behavior defined in the Report Setting is compatible with a time-domain behavior in the CSI-RS resources contained within the CSI-RS Resource Set. In some embodiments, the dynamic indication is given by DCI. In some embodiments, the dynamic indication is given by MAC CE. In some embodiments, the number of Report Settings M linked to one Resource Setting (N=1) is set equal to the number of CSI-RS Resource Sets S within the one Resource Setting. In some embodiments, a whole of a Report Setting corresponds to only one CSI-RS Resource Set. In some embodiments, entities dynamically indicated explicitly include a selection of one or more CSI Report Setting(s) and a selection of one or more CSI-RS resources. In some embodiments, the indication of CSI-RS Resource Set is implicitly given by the dynamic indication of the selection of CSI Report Setting(s). In some embodiments, one Report Setting (M=1) is linked to one Resource Setting (N=1) which contains S CSI-RS Resource Sets.

According to yet another aspect, a wireless device 40 for determining channel state information reference symbol, CSI-RS, resources indicated by a base station 20, the wireless device 40 comprising processing circuitry 42 configured to determine a CSI-RS resource set based on an indication of a CSI report setting, the CSI-RS report setting having a one-to-one correspondence to a CSI-RS resource set.

According to this aspect, in some embodiments, the wireless device further includes a 52 receiver configured to receive from the base station 20 an indication of the CSI report setting and the CSI-RS resources. In some embodiments, an integer number of different CSI-RS resource sets is linked to one CSI report setting. In some embodiments, a resource set is unique to at least one of a number of antenna ports and a particular time-domain behavior of the resources in the set. In some embodiments, the CSI-RS resource set includes resources used for channel measurements.

According to yet another aspect, a wireless device (40) for determining a channel state information reference symbol, CSI-RS, resources indicated by a base station 20 is provided. The wireless device 40 includes a determination module (51) for determining a CSI-RS resource set based on an indication of a CSI report setting, the CSI-RS report setting having a one-to-one correspondence to a CSI-RS resource set.

According to another aspect, a method for a base station 20 is provided. The method includes sending, to the wireless device 40, a dynamic indication of a CSI report setting and one or more CSI-RS resources, wherein a one-to-one correspondence between a CSI report setting and a CSI-reference symbol, RS, resource set is established (S102A).

According to this aspect, in some embodiments, a total number of bits to be sent for indicating one CSI report setting, and one CSI-RS resource is $\lceil\log_2(N)\rceil+\lceil\log_2(K_s)\rceil$ bits, where N is the number of CSI Report Settings and $K_s$ is the number of CSI-RS resources. In some embodiments, an integer number of different CSI-RS resource sets is linked to one CSI report setting. In some embodiments, a resource set is unique to at least one of a number of antenna ports and a particular time-domain behavior of the resources in the set.

According to another aspect, a base station 20 using control signaling for dynamic indication of channel state information (CSI) resources to a wireless device 40 is provided. The base station 20 includes processing circuitry configured to send to the wireless device 40, an indication of the CSI report setting and the CSI-RS resources, wherein a one-to-one correspondence between a CSI report setting and a CSI-reference symbol RS resource set is established.

According to this aspect, in some embodiments, a total number of bits to be sent for indicating one CSI report setting, and one CSI-RD resource is $\lceil\log_2(N)\rceil+\lceil\log_2(K_s)\rceil$ bits, where N is the number of CSI Report Settings and $K_s$ is the number of CSI-RS resources. In some embodiments, an integer number of different CSI-RS resource sets is linked to one CSI report setting. In some embodiments, a resource set is unique to at least one of a number of antenna ports and a particular time-domain behavior of the resources in the set.

According to yet another aspect, a base station 20 for signaling channel state information reference symbol, CSI-RS, resources to be used by a wireless device 40 is provided. The method includes at least one of selecting one or more CSI-RS resource sets; selecting one or more CSI-RS resources in each of the selected CSI-RS resource sets; and selecting the maximum number of CSI-RS resources in a CSI-RS resource set, the selecting of the maximum number calculated to achieve a similarity between numbers of CSI-RS resources in the one or more CSI-RS resource sets.

According to another aspect, a base station 20 for signaling channel state information reference symbol, CRS-RS, resources to be used by a wireless device 40 is provided. The base station 20 includes processing circuitry 22 configured to perform at least one of: selecting one or more CSI-RS resource sets; selecting one or more CSI-RS resources in each of the selected CSI-RS resource sets; and selecting a maximum number of CSI-RS resources in a CSI-RS resource set, the selecting of the maximum number calculated to achieve a similarity between numbers of CSI-RS resources in the one or more CSI-RS resource sets.

According to yet another aspect, a method of initiating channel state information, CSI, feedback in a wireless device configured by higher layers with a CSI Report containing parameters related to CSI reporting is provided. The method includes receiving a dynamic indication associated with a correspondence between the CSI Report and the resources used for channel measurement.

According to another aspect, a method for a wireless device for determining a channel state information reference symbol, CSI-RS, set of resources indicated by a base station. The method includes determining a CSI-RS set of resources based on an indication of a CSI report, the CSI report having a one-to-one correspondence to the CSI-RS set of resources.

According to this aspect, in some embodiments, the CSI-RS resource set includes resources used for channel measurement. In some embodiments, a codebook configuration and one or more related parameters defined in the Report Setting are compatible with a number of ports in the CSI-RS resources contained within a CSI-RS Resource Set. In some embodiments, a time-domain behavior defined in the Report Setting is compatible with a time-domain behavior in the CSI-RS resources contained within the CSI-RS Resource Set. In some embodiments, the dynamic indication is given by DCI. In some embodiments, the dynamic indication is given by MAC CE. In some embodiments, a resource set is unique to at least one of a number of antenna ports and a particular time-domain behavior of the resources in the set.

According to yet another aspect, a user equipment 40 initiating channel state information, CSI, feedback in a user equipment configured by higher layers with M Report Settings containing parameters related to CSI reporting and N Resource Settings containing parameters defining the resources used for channel measurement and their properties is provided. The user equipment 40 includes processing circuitry 42 configured to perform at least one of: a) Obtaining Preconfigured linkages between the Report Settings and the Resource Settings via higher layer configuration (S120); b) Determining S CSI-RS Resources Sets within each Resource Setting based on higher layer configuration wherein a CSI-RS Resource Set contains multiple CSI-RS resources used for channel measurement (S122); c) Receiving via higher layer configuration a Preconfigured correspondence between a CSI-RS Resource Set within a Resource Setting and a part or whole of a CSI Report Setting that is linked to the Resource Setting using parameter configuration compatibility (S124); and d) Receiving a dynamic indication associated with the correspondence between the CSI-RS Resource Set and the CSI Report Setting (S126).

According to this aspect, in some embodiments, a codebook configuration and one or more related parameters defined in the Report Setting are compatible with a number of ports in the CSI-RS resources contained within a CSI-RS Resource Set. In some embodiments, a time-domain behavior defined in the Report Setting is compatible with a time-domain behavior in the CSI-RS resources contained within the CSI-RS Resource Set. In some embodiments, the dynamic indication is given by DCI. In some embodiments, the dynamic indication is given by MAC CE. In some embodiments, the number of Report Settings M linked to one Resource Setting (N=1) is set equal to the number of CSI-RS Resource Sets S within the one Resource Setting. In some embodiments, a whole of a Report Setting corresponds to only one CSI-RS Resource Set. In some embodiments, entities dynamically indicated explicitly include a selection of one or more CSI Report Setting(s) and a selection of one or more CSI-RS resources. In some embodiments, the indication of CSI-RS Resource Set is implicitly given by the dynamic indication of the selection of CSI Report Setting(s). In some embodiments, one Report Setting (M=1) is linked to one Resource Setting (N=1) which contains S CSI-RS Resource Sets.

According to another aspect, a user equipment 40 for determining channel state information reference symbol, CSI-RS, resources indicated by a base station 20 is provided. The user equipment 40 includes processing circuitry 42 configured to determine a CSI-RS resource set based on an indication of a CSI report setting, the CSI-RS report setting having a one-to-one correspondence to a CSI-RS resource set.

According to this aspect, in some embodiments, the user equipment 40 further includes a receiver configured to receive from the base station 20 an indication of the CSI report setting and the CSI-RS resources. In some embodiments, an integer number of different CSI-RS resource sets is linked to one CSI report setting. In some embodiments, a resource set is unique to at least one of a number of antenna ports and a particular time-domain behavior of the resources in the set. In some embodiments, the CSI-RS resource set includes resources used for channel measurements.

According to yet another aspect, a user equipment 40 for determining a channel state information reference symbol, CSI-RS, resources indicated by a base station 20 is provided. The user equipment 40 includes a determination module 51 for determining a CSI-RS resource set based on an indication of a CSI report setting, the CSI-RS report setting having a one-to-one correspondence to a CSI-RS resource set.

According to yet another embodiment, a wireless device configured for initiating channel state information, CSI, feedback, the wireless device being configured by higher layers with a CSI Report containing parameters related to CSI reporting is provided. The wireless device includes a receiver 52 configured to receive a dynamic indication associated with a correspondence between the CSI Report and the resources used for channel measurement.

According to another aspect, a wireless device 40 for determining a channel state information reference symbol, CSI-RS, set of resources indicated by a base station is provided. The wireless device includes processing circuitry 42 configured to determine a CSI-RS set of resources based on an indication of a CSI report, the CSI report having a one-to-one correspondence to the CSI-RS set of resources.

Some embodiments include the following:

Embodiment 1. A method of initiating CSI feedback in a wireless device configured by higher layers with M Report Settings containing parameters related to CSI reporting and N Resource Settings containing parameters defining the resources used for channel measurement and their properties, the method comprising at least one of:
  a) Obtaining Preconfigured linkage between the Report Settings and the Resource Settings,
  b) Determining S CSI-RS Resources Sets within each Resource Setting wherein a CSI-RS Resource Set contains multiple CSI-RS resources used for channel measurement,
  c) Obtaining a Preconfigured correspondence between a CSI-RS Resource Set within a Resource Setting and a part or whole of a CSI Report Setting that is linked to the Resource Setting using parameter configuration compatibility, and
  d) Receiving dynamic indication that exploits the correspondence between the CSI-RS Resource Set and the CSI Report Setting to reduce control signaling overhead.

Note: In some cases, the information in steps (a)-(c) above may be part of the higher layer configuration.

Embodiment 2. The method of Embodiment 1, wherein the number of Report Settings M linked to one Resource Setting (N=1) is set equal to the number of CSI-RS Resource Sets S within the one Resource Setting.

Embodiment 3. The method of any of Embodiments 1, 2A and 2B, wherein a whole of a Report Setting corresponds to only one CSI-RS Resource Set.

Embodiment 4. The method of any of Embodiments 1-3, wherein codebook configuration and related parameters defined in the Report Setting is compatible with the number of ports in the CSI-RS resources contained within the CSI-RS Resource Set.

Embodiment 5. The method of any of Embodiments 1-3, wherein a time-domain behavior defined in the Report Setting is compatible with a time-domain behavior in the CSI-RS resources contained within the CSI-RS Resource Set.

Embodiment 6. The method of any of Embodiments 1-3, wherein entities dynamically indicated explicitly include a selection of one or more CSI Report Setting(s) and a selection of one or more CSI-RS resources.

Embodiment 7. The method of any of Embodiments 1-3 and 6, wherein the indication of CSI-RS Resource Set is implicitly given by the dynamic indication of the selection of CSI Report Setting(s).

Embodiment 8. The method of any of Embodiments 1-3 and 6, wherein the dynamic indication is given by DCI.

Embodiment 9. The method of any of Embodiments 1-3 and 6, wherein the dynamic indication is given by MAC CE.

Embodiment 10. The method of Embodiment 1, wherein one Report Setting (M=1) is linked to one Resource Setting (N=1) which contains S CSI-RS Resource Sets.

Embodiment 11. The method of any of Embodiments 1 and 10, wherein the Report Setting contains S Report Subsets.

Embodiment 12. The method of any of Embodiments 1, 10 and 11, wherein one Report Subset which is part of the Report Setting corresponds to only one CSI-RS Resource Set.

Embodiment 13. The method of any of Embodiments 1 and 10-12, wherein codebook configuration and related parameters defined in the Report Subset is compatible with the number of ports in the CSI-RS resources contained within the CSI-RS Resource Set.

Embodiment 14. The method of any of Embodiments 1 and 10-12, wherein a time-domain behavior defined in the Report Subset is compatible with a time-domain behavior in the CSI-RS resources contained within the CSI-RS Resource Set.

Embodiment 15. The method of any of Embodiments 1 and 10-12, wherein entities dynamically indicated explicitly include a selection of CSI Report Setting, a selection of one or more CSI-RS Resource Set(s) and a selection of one or more CSI-RS resources.

Embodiment 16. The method of any of Embodiments 1, 10-12 and 15, wherein the indication of Report Subset is implicitly given by the dynamic indication of the selection of CSI Report Setting and the selection of CSI-RS Resource Set(s).

Embodiment 17. The method of any of Embodiments 1 and 10-12, wherein the dynamic indication is given by DCI.

Embodiment 18. The method of any of Embodiments 1 and 10-12, wherein the dynamic indication is given by MAC CE.

Embodiment 19. A method for a base station using control signaling for dynamic indication of channel state information (CSI) resources to a wireless device, the method comprising:
establishing one of:
a one-to-one correspondence between a CSI report setting and a CSI-reference symbol (RS) resource set so that the CSI-RS resource set may be determined at the wireless device from an indication of the CSI report setting; and
a one-to-one correspondence between a report subset and a CSI-RS resource set so that a report subset may be determined at the wireless device from an indication of the CSI-RS resource set and an indication of CSI report setting.

Embodiment 20. The method of Embodiment 19, further comprising sending to the wireless device, an indication of the CSI report setting and the CSI-RS resources.

Embodiment 21. The method of any of Embodiments 19 and 20, wherein a total number of bits to be sent for indicating one CSI report setting, and one CSI-RS resource is $\lceil \log_2(N) \rceil + \lceil \log_2(K_s) \rceil$ bits, where N is the number of CSI Report Settings and $K_s$ is the number of CSI-RS resources.

Embodiment 22. The method of Embodiment 19, wherein an integer number of different CSI-RS resource sets is linked to one CSI report setting.

Embodiment 23. The method of any of Embodiments 19-22, wherein a resource set is unique to a number of antenna ports and a particular time-domain behavior of the resources in the set.

Embodiment 24. A base station using control signaling for dynamic indication of channel state information (CSI) resources to a wireless device, the base station comprising:
processing circuitry configured to establish one of:
a one-to-one correspondence between a CSI report setting and a CSI-reference symbol (RS) resource set so that the CSI-RS resource set may be determined at the wireless device from an indication of the CSI report setting; and
a one-to-one correspondence between a report subset and a CSI-RS resource set so that a report subset may be determined at the wireless device from an indication of the CSI-RS resource set and an indication of CSI report setting.

Embodiment 25. The base station of Embodiment 24, further comprising a transmitter configured to send to the wireless device, an indication of the CSI report setting and the CSI-RS resources.

Embodiment 26. The base station of any of Embodiments 24 and 25, wherein a total number of bits to be sent for indicating one CSI report setting, and one CSI-RD resource is $\lceil \log_2(N) \rceil + \lceil \log_2(K_s) \rceil$ bits, where N is the number of CSI Report Settings and $K_s$ is the number of CSI-RS resources.

Embodiment 27. The base station of Embodiment 24, wherein an integer number of different CSI-RS resource sets is linked to one CSI report setting.

Embodiment 28. The base station of any of Embodiments 24-27, wherein a resource set is unique to a number of antenna ports and a particular time-domain behavior of the resources in the set.

Embodiment 29. A base station using control signaling for dynamic indication of channel state information (CSI) resources to a wireless device, the base station comprising:
an association module configured to establish one of:
a one-to-one correspondence between a CSI report setting and a CSI-reference symbol (RS) resource set so that the CSI-RS resource set may be determined at the wireless device from an indication of the CSI report setting; and
a one-to-one correspondence between a report subset and a CSI-RS resource set so that a report subset may be determined at the wireless device from an indication of the CSI-RS resource set and an indication of CSI report setting.

Embodiment 30. A method for a wireless device for determining a channel state information reference symbol, CSI-RS, resource set indicated by a base station, the method comprising:
determining one of:
a CSI-RS resource set based on an indication of a CSI report setting, the CSI report setting having a one-to-one correspondence to a CSI-RS resource set; and
a report subset based on a CSI report setting and a CSI-RS resource set, the CSI-RS resource set having a one-to-one correspondence to a report subset.

Embodiment 31. The method of Embodiment 30, further comprising receiving from the base station, an indication of the CSI report setting and the CSI-RS resources.

Embodiment 32. The method of Embodiment 30, wherein an integer number of different CSI-RS resource sets is linked to one CSI report setting.

Embodiment 33. The method of any of Embodiments 30-32, wherein a resource set is unique to a number of antenna ports and a particular time-domain behavior of the resources in the set.

Embodiment 34. A wireless device for determining channel state information reference symbol, CSI-RS, resources indicated by a base station, the wireless device comprising:
processing circuitry configured to determine one of:
a CSI-RS resource set based on an indication of a CSI report setting, the CSI-RS report setting having a one-to-one correspondence to a CSI-RS resource set; and
a report subset based on a CSI report setting and a CSI-RS resource set, the CSI-RS resource set having a one-to-one correspondence to a report subset.

Embodiment 35. The wireless device of Embodiment 34, further comprising a receiver configured to receive from the base station an indication of the CSI report setting and the CSI-RS resources.

Embodiment 36. The wireless device of Embodiment 34, wherein an integer number of different CSI-RS resource sets is linked to one CSI report setting.

Embodiment 37. The wireless device of any of Embodiments 34-36, wherein a resource set is unique to a number of antenna ports and a particular time-domain behavior of the resources in the set.

Embodiment 38. A wireless device for determining a channel state information reference symbol, CSI-RS, resources indicated by a base station, the wireless device comprising:
a determination module configured to determine one of:
a CSI-RS resource set based on an indication of a CSI report setting, the CSI-RS report setting having a one-to-one correspondence to a CSI-RS resource set; and
a report subset based on a CSI report setting and a CSI-RS resource set, the CSI-RS resource set having a one-to-one correspondence to a report subset.

Embodiment 39. A method for a base station for signaling channel state information reference symbol, CSI-RS, resources to be used by a wireless device, the method including at least one of:
selecting one or more CSI-RS resource sets;
selecting one or more CSI-RS resources in each of the selected CSI-RS resource sets; and
selecting the maximum number of CSI-RS resources in a CSI-RS resource set, the selecting of the maximum number calculated to achieve a similarity between numbers of CSI-RS resources in the one or more CSI-RS resource sets.

Embodiment 40. The method of Embodiment 39, wherein each CSI-RS resource set contains CSI-RS resources with different numbers of antenna ports.

Embodiment 41. The method of any of Embodiments 39 and 40, wherein each CSI-RS resource set contains CSI-RS resources with different time domain behavior.

Embodiment 42. A base station for signaling channel state information reference symbol, CRS-RS, resources to be used by a wireless device, the base station comprising:
processing circuitry configured to perform at least one of:
select one or more CSI-RS resource sets;
select one or more CSI-RS resources in each of the selected CSI-RS resource sets; and
select the maximum number of CSI-RS resources in a CSI-RS resource set, the selecting of the maximum number calculated to achieve a similarity between numbers of CSI-RS resources in the one or more CSI-RS resource sets.

Embodiment 43. A method for a wireless device for receiving channel state information reference symbol, CSI-RS, resources from a base station, wherein the CSI-RS resources are obtained according to the method of any of Embodiments 39-41.

Embodiment 44. A wireless device for receiving channel state information reference symbol, CRS-RS, resources from a base station, the wireless device comprising:
processing circuitry configured to process CSI-RS resources obtained according to the method of any of Embodiments 39-41.

| Abbreviation | Definition |
| --- | --- |
| CSI | Channel State Information |
| TRP | Transmission/Reception Point |
| UE | User Equipment |
| NW | Network |
| BPL | Beam Pair Link |
| BLF | Beam Pair Link Failure |
| BLM | Beam Pair Link Monitoring |
| BPS | Beam Pair Link Switch |
| RLM | Radio Link Monitoring |
| RLF | Radio Link Failure |
| PDCCH | Physical Downlink Control Channel |
| RRC | Radio Resource Control |
| CRS | Cell-specific Reference Signal |
| CSI-RS | Channel State Information Reference Signal |
| RSRP | Reference Signal Received Power |
| RSRQ | Reference Signal Received Quality |
| HARQ | Hybrid Automatic Repeat-reQuest |
| gNB | New Radio (NR) base station node |
| PRB | Physical Resource Block |
| RE | Resource Element |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for channel state information, CSI, feedback in a user equipment configured by higher layers with M CSI Report Settings containing parameters related to CSI reporting and N Resource Settings containing parameters defining S CSI Resource Sets for channel measurement and their properties, the method comprising:
   receiving a dynamic indication of a CSI Report Setting of the M CSI Report Settings and of CSI-Reference Signal, CSI-RS, resources;
   determining a CSI-RS Resources Set based on:
      the received dynamic indication of the CSI Report Setting; and
      one of a plurality of preconfigured correspondences, the one of the plurality of preconfigured correspondences being between one CSI Report Setting of the M CSI Report Settings and a CSI-RS Resource Set of the S CSI-Resource Sets that is defined by the configuration of the M CSI Report Settings and N Resource Settings;
   a time-domain behavior defined in the CSI Report Setting being compatible with a time-domain behavior in CSI-RS resources contained within the CSI-RS Resource Set; and
   initiating the CSI feedback based at least on the determination.

2. The method of claim 1, wherein a codebook configuration and one or more related parameters defined in the CSI Report Setting are compatible with a number of ports in CSI-RS resources contained within the CSI-RS Resource Set.

3. The method of claim 1, wherein the dynamic indication is given by DCI.

4. The method of claim 1, wherein the dynamic indication is given by MAC CE.

5. The method of claim 1, wherein the M CSI Report Settings linked to one Resource Setting (N=1) is set equal to the S CSI-RS Resource Sets within the one Resource Setting.

6. The method of claim 1, wherein a whole of CSI Report Setting corresponds to only one CSI-RS Resource Set.

7. The method of claim 1, wherein the dynamic indication explicitly indicates a selection of one or more CSI Report Setting(s) and a selection of one or more CSI-RS resources.

8. The method of claim 1, wherein one CSI Report Setting (M=1) is linked to one Resource Setting (N=1) which contains S CSI-RS Resource Sets.

9. A method for a base station for signaling channel state information reference signal, CSI-RS, resources to be used by a wireless device, the method including:
   configuring the wireless device by higher layers with M CSI Report Settings containing parameters related to CSI reporting and N Resource Settings containing parameters defining S CSI-RS Resource Sets for use for channel measurement and their properties;
   sending, to the wireless device, a dynamic indication of a CSI report setting of the M CSI Report Settings and of CSI-RS resources;
   the dynamic indication and one of a plurality of preconfigured correspondences are configured to allow the wireless device to determine a CSI-RS Resource Set, the one of the plurality of preconfigured correspondences being between one CSI Report Setting of the M CSI Report Settings and a CSI-RS Resource Set of the S CSI Resource Sets that is defined by the configuration of the M CSI Report Settings and N Resource Settings; and
   a time-domain behavior defined in the CSI Report Setting being compatible with a time-domain behavior in CSI-RS resources contained within the CSI-RS Resource Set.

10. A user equipment configured by higher layers with M CSI Report Settings containing parameters related to CSI reporting and N Resource Settings containing parameters defining S CSI Resource Sets for channel measurement and their properties, the user equipment comprising processing circuitry configured to:
- receive a dynamic indication of a CSI Report Setting of the M CSI Report Settings and of CSI-Reference Signal, CSI-RS, resources;
- determine a CSI-RS Resources Set based on:
  - the received dynamic indication of the CSI Report Setting; and
  - one of a plurality of preconfigured correspondences, the one of the plurality of correspondences being between one CSI Report Setting of the M CSI Report Settings and a CSI-RS Resource Set of the S CSI-Resource Sets that is defined by the configuration of the M CSI Report Settings and N Resource Settings;
- a time-domain behavior defined in the CSI Report Setting being compatible with a time-domain behavior in CSI-RS resources contained within the CSI-RS Resource Set; and
- initiate the CSI feedback based at least on the determination.

11. The user equipment of claim 10, wherein a codebook configuration and one or more related parameters defined in the CSI Report Setting are compatible with a number of ports in CSI-RS resources contained within the CSI-RS Resource Set.

12. The user equipment of claim 10, wherein the dynamic indication is given by DCI.

13. The user equipment of claim 10, wherein the dynamic indication is given by MAC CE.

14. The user equipment of claim 10, wherein the M CSI Report Settings linked to one Resource Setting (N=1) is set equal to the S CSI-RS Resource Sets within the one Resource Setting.

15. The user equipment of claim 10, wherein the dynamic indication explicitly indicates a selection of one or more CSI Report Setting(s) and a selection of one or more CSI-RS resources.

16. The user equipment of claim 10, wherein one CSI Report Setting (M=1) is linked to one Resource Setting (N=1) which contains S CSI-RS Resource Sets.

* * * * *